(12) United States Patent
Centonza et al.

(10) Patent No.: US 11,089,513 B2
(45) Date of Patent: Aug. 10, 2021

(54) DUPLICATION OF TRAFFIC OF A RADIO BEARER OVER MULTIPLE PATHS

(71) Applicant: Telefonaktiebolaget LM Ericsson (publ), Stockholm (SE)

(72) Inventors: Angelo Centonza, Stockholm (SE); Torsten Dudda, Aachen (DE); Matteo Fiorani, Solna (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 16/486,560

(22) PCT Filed: Jun. 20, 2019

(86) PCT No.: PCT/SE2019/050599
§ 371 (c)(1),
(2) Date: Aug. 16, 2019

(87) PCT Pub. No.: WO2019/245447
PCT Pub. Date: Dec. 26, 2019

(65) Prior Publication Data
US 2021/0084539 A1   Mar. 18, 2021

Related U.S. Application Data

(60) Provisional application No. 62/688,124, filed on Jun. 21, 2018.

(51) Int. Cl.
*H04W 28/12* (2009.01)
*H04W 28/06* (2009.01)
(Continued)

(52) U.S. Cl.
CPC .......... *H04W 28/12* (2013.01); *H04W 28/06* (2013.01); *H04W 28/085* (2013.01); *H04W 80/02* (2013.01)

(58) Field of Classification Search
CPC .................................................. H04W 28/085
See application file for complete search history.

(56) References Cited

U.S. PATENT DOCUMENTS

2018/0368132 A1* 12/2018 Babaei .................. H04W 80/02
2019/0253915 A1*  8/2019 Joseph ............. H04W 28/0215
(Continued)

OTHER PUBLICATIONS

Unknown, Author, "(TP for EN-DC BL CR for TS 38.473):Support of PDCP Duplication for DRB", 3GPP TSG-RAN WG3#100, R3-183545, Busan, Korean, May 21-25, 2018, pp. 1-19.
(Continued)

*Primary Examiner* — Fahmida S Chowdhury
(74) *Attorney, Agent, or Firm* — Sage Patent Group

(57) ABSTRACT

Radio network equipment (1700) is configured to implement a radio access network, RAN, central unit (12-C). The radio network equipment (1700) is configured to decide, by the RAN central unit (12-C), which of multiple RAN distributed units (12-D1, 12-D2) is to be responsible for activating duplication of traffic of a radio bearer (16) over multiple paths (16-1, 16-2). Different ones of the RAN distributed units (12-D1, 12-D2) serve different respective ones of the multiple paths (16-1, 16-2). The radio network equipment (1700) is also configured to transmit, from the RAN central unit (12-C), control signalling (20) to each of one or more of the RAN distributed units (12-D1, 12-D2) indicating whether or not the RAN distributed unit is responsible for activating duplication of the traffic of the radio bearer (16) over the multiple paths (16-1, 16-2).

26 Claims, 30 Drawing Sheets

(51) Int. Cl.
*H04W 28/08* (2009.01)
*H04W 80/02* (2009.01)

(56) References Cited

U.S. PATENT DOCUMENTS

2019/0357196 A1\* 11/2019 Majmundar ............ H04L 69/22
2020/0358558 A1\* 11/2020 Tang ...................... H04W 8/26

OTHER PUBLICATIONS

Unknown, Author, "(TP for SA BL CR for TS 38A73): Support of PDCP Duplication for SRB", 3GPP TSG-RAN WG3#100, R3-183419, Busan, Korean, May 21-25, 2018, pp. 1-15.
Unknown, Author, "3GPP Draft Meeting Report for TSG RAN WG3 meeting: 1801", Sophia Antipolis, France, Jan. 22-26, 2018, pp. 1-196.
Unknown, Author, "3rd Generation Partnership Project; Technical Specification Group Radio Access Network; NG-RAN; Architecture description (Release 15)", 3GPP TS 38.401 V15.1.0, Mar. 2018, pp. 1-23.
Unknown, Author, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.
Unknown, Author, "Consideration on the activation or deactivation of duplication", 3GPP TSG-RAN WG3 #98;R3-174408; Reno, NV, Nov. 27-Dec. 1, 2017, pp. 1-3.
Unknown, Author, "Report of 3GPP TSG RAN3 meeting AH-1801", 3GPP TSG RAN meeting #99, R3-180667, Athens, Greece, Feb. 27-Mar. 2, 2018, pp. 1-180.

\* cited by examiner

DUPLICATION OF TRAFFIC OF A RADIO BEARER OVER MULTIPLE PATHS

TECHNICAL FIELD

The present application relates generally to communicating traffic of a radio bearer over multiple paths in a wireless communication system, and relates more particularly to duplicating that traffic over the multiple paths.

BACKGROUND

Functionality of a radio access network may be split between a so-called central unit (CU) and one or more distributed units (DUs). The CU and DUs implement or terminate different respective portions of a radio protocol stack towards a wireless device, e.g., so as to collectively perform the functions of a traditional base station. In this context, a radio bearer between the CU and the wireless device may be "split" so as to have different paths between the CU and device, via different DUs. Where the device is capable of dual connectivity, the device may have simultaneous connectivity over multiple ones of those paths.

Simultaneous connection over multiple paths may be exploited by duplicating the radio bearer's traffic over the multiple paths, e.g., for redundancy. Problematically, though, such duplication may not prove optimal under all circumstances, e.g., if channel conditions at the device are good enough that redundancy is unnecessary.

SUMMARY

According to some embodiments herein, a radio access network (RAN) central unit decides which of multiple RAN distributed units is to be responsible for activating duplication of traffic of a radio bearer over multiple paths, where different ones of the distributed units serve different respective ones of those paths. The RAN central unit correspondingly transmits control signaling to each of one or more of the RAN distributed units indicating whether or not that distributed unit is responsible for activating duplication. A RAN distributed unit that receives this control signaling then configures itself to take on responsibility for activating duplication or to be relieved from that responsibility, according to the control signaling.

The RAN central unit in these embodiments thereby delegates responsibility for duplication activation to one of the RAN distributed units, e.g., so as to centrally coordinate among the distributed units which of the distributed units has that responsibility. This notably avoids ambiguity regarding whether duplication is activated and avoids ambiguity regarding which entity has responsibility for activating duplication. At the same time, the embodiments locate the duplication activation decision at a RAN distributed unit that is "closer" to the device than the RAN central unit, e.g., since the RAN distributed unit may have more ready access to channel state information based on which the decision can be made.

More particularly, embodiments herein include a performed by radio network equipment configured to implement a radio access network (RAN) central unit. The method comprises deciding, by the RAN central unit, which of multiple RAN distributed units is to be responsible for activating duplication of traffic of a radio bearer over multiple paths. Different ones of the RAN distributed units serve different respective ones of the multiple paths. The method also comprises transmitting, by the RAN central unit, control signalling to each of one or more of the RAN distributed units indicating whether or not the RAN distributed unit is responsible for activating duplication of the traffic of the radio bearer over the multiple paths.

In some embodiments, the control signalling is included in a context setup request message.

In some embodiments, deciding which of the RAN distributed units is to be responsible for activating duplication of the traffic of the radio bearer over the multiple paths comprises deciding which of the multiple paths is the primary path over which the traffic is to be transmitted irrespective of whether the traffic is also transmitted in duplicate over one or more others of the multiple paths. Here, the RAN distributed unit that serves the primary path is responsible for said activating.

In some embodiments, the method further comprises receiving at the RAN central unit channel state information indicating channel conditions for the wireless device. In this case, deciding which of the RAN distributed units is to be responsible for activating duplication of the traffic of the radio bearer over the multiple paths is performed based on the received channel state information.

In some embodiments, the method further comprises transmitting, to a RAN distributed unit responsible for activating duplication of the traffic of the radio bearer over the multiple paths, control signalling indicating whether or not duplication of traffic of a different radio bearer is activated.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Embodiments also include a method performed by radio network equipment configured to implement a radio access network, RAN, distributed unit. The method comprises configuring the RAN distributed unit to serve one of multiple paths over which traffic of a radio bearer is configurable to be transmitted in duplicate between a RAN central unit and a wireless device. Different RAN distributed units serve different respective ones of the multiple paths. The method further comprises receiving by the RAN distributed unit control signaling from the RAN central unit indicating whether or not the RAN distributed unit is responsible for activating duplication of the traffic of the radio bearer over the multiple paths. The method may further include configuring the RAN distributed unit to take on responsibility for activating said duplication or to be relieved from that responsibility according to the control signalling.

In some embodiments, the control signalling is included in a context setup request message.

In some embodiments, the method further comprises receiving, from the RAN central unit, control signalling indicating whether duplication of traffic of a different radio bearer is to be activated or de-activated.

In some embodiments, the method further comprises deciding whether to activate or de-activate duplication of the traffic of the radio bearer over the multiple paths; and transmitting to the wireless device control signaling indicating: (i) whether duplication of the traffic of the radio bearer is to be activated or de-activated in accordance with said deciding; and (ii) whether duplication of the traffic of the different radio bearer is to be activated or de-activated in accordance with the received control signaling.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Embodiments also include corresponding apparatus, computer programs, and carriers. For example, embodiments include radio network equipment configured to implement a radio access network (RAN) central unit. The radio network equipment is configured (e.g., via communication circuitry and processing circuitry) to decide, by the RAN central unit, which of multiple RAN distributed units is to be responsible for activating duplication of traffic of a radio bearer over multiple paths. Different ones of the RAN distributed units serve different respective ones of the multiple paths. The radio network equipment may also be configured to transmit, by the RAN central unit, control signalling to each of one or more of the RAN distributed units indicating whether or not the RAN distributed unit is responsible for activating duplication of the traffic of the radio bearer over the multiple paths.

Embodiments further include radio network equipment configured to implement a radio access network, RAN, distributed unit. The radio network equipment is configured (e.g., via communication circuitry and processing circuitry) to configure the RAN distributed unit to serve one of multiple paths over which traffic of a radio bearer is configurable to be transmitted in duplicate between a RAN central unit and a wireless device. Different RAN distributed units serve different respective ones of the multiple paths. The radio network equipment is further configured to receive by the RAN distributed unit control signaling from the RAN central unit indicating whether or not the RAN distributed unit is responsible for activating duplication of the traffic of the radio bearer over the multiple paths. The radio network equipment is further configured to configure the RAN distributed unit to take on responsibility for activating said duplication or to be relieved from that responsibility according to the control signalling.

DETAILED DESCRIPTION

Figure 1:
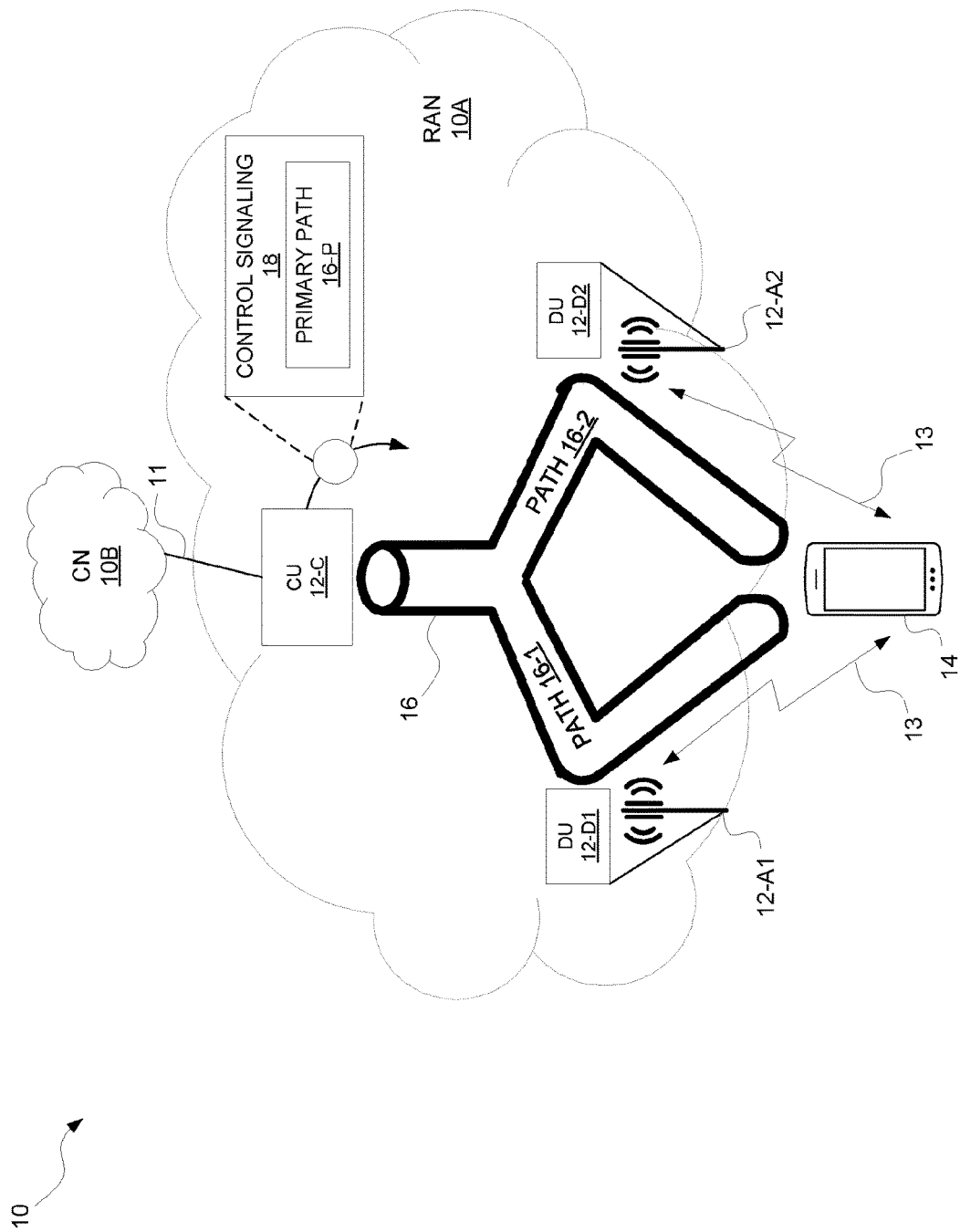
FIG. 1 is a block diagram of a wireless communication system with a radio access network (RAN) central unit and RAN distributed units according to some embodiments.

FIG. 1 shows a wireless communication system 10 according to some embodiments. The system 10 includes a radio access network (RAN) 10A and a core network (CN) 10B. A wireless device 14 wirelessly communicates with the RAN 10A in order to connect via the RAN 10A to the CN 10B. The CN 10B in turn connects the wireless device 14 to one or more data networks (not shown) such as the Internet.

The RAN 10A splits RAN functionality between so-called central units (CUs) and distributed units (DUs). FIG. 1 for example shows one RAN central unit 12-C and multiple RAN distributed units (DUs) 12-D1 and 12-D2 communicatively connected to the RAN CU 12-C, e.g., over respective fronthaul interfaces (not shown). The RAN CU 12-C and RAN DUs implement or terminate different respective portions of a radio protocol stack towards the wireless device 14, e.g., so as to collectively perform the functions of a traditional base station. The RAN CU 12-C may implement, host, or terminate relatively higher layers of the radio protocol stack whereas the RAN DUs 12-D1, 12-D2 may each implement, host terminate relatively lower layers of the radio protocol stack. In some embodiments, for example, the RAN CU 12-C is a logical node that hosts a packet data convergence protocol (PDCP) and a radio resource control (RRC) protocol, whereas each RAN DU is a logical node that hosts a radio link control (RLC) protocol, medium access control (MAC) protocol, and a physical (PHY) layer protocol. Such a split may be due at least in part to a non-ideal or low performance fronthaul interface between the RAN CU 12-C and RAN DUs 12-D1, 12-D2. Other functional and/or protocol stack splits are possible. In other embodiments, the split may implement real-time functionality at the RAN DUs 12-D1, 12-D2 but implement non-real-time functionality at the RAN CU 12-C. Alternatively or additionally, the RAN CU 12-C terminates an interface 11 to the CN 10B and each RAN DU 12-D1, 12-D2 terminates a radio interface 13 to the wireless device 14. In this regard, the RAN DUs 12-D1, 12-D2 may be respectively co-located with or otherwise associated with antenna(s) 12-A1 and antenna(s) 12-A2. Radio frequency (RF) functionality may be implemented by the RAN DUs 12-D1, 12-D2 or by remote radio units (RRUs) co-located with the antenna(s). No matter the particular nature of the RAN functional split, such split facilitates at least partial implementation of the RAN 10A in the cloud and/or in a virtualized environment, which may in turn prove advantageous in terms of scalability, flexibility, cost, data latency, and upgradability.

In this context, FIG. 1 shows a radio bearer 16 established or configured between the RAN CU 12-C and the wireless device 14. The radio bearer 16 may be a logical path between the RAN CU 12-C and the wireless device 14. The radio bearer 16 may be associated with certain quality of service requirements of traffic to be transported on the radio bearer 16, e.g., requirements on bit rate, packet delay, packet loss, bit error rate, scheduling policy, etc. In this way, different types of radio bearers enable differentiated treatment of traffic based on the QoS requirements of the traffic. In some embodiments, the radio bearer 16 may constitute a signaling radio bearer (SRB) or a data radio bearer (DRB).

FIG. 1 also shows that the radio bearer 16 is in a sense "split" so as to have different radio bearer "paths" between the RAN CU 12-C and the wireless device 14, via different RAN DUs. RAN DU 12-D1 serves one path referred to as path 16-1, whereas RAN DU 12-2 serves another path referred to as path 16-2. Where RAN DU 12-D1 serves one group of one or more cells and RAN DU 12-D2 serves another group of one or more cells, the paths 16-1, 16-2 are served by different cell groups, e.g., a master cell group (MCG) and a secondary cell group (SCG). The wireless device 14 in some of these embodiments may be configured for dual connectivity (DC) in the sense that the wireless device 14 is capable of simultaneous connectivity over multiple ones of the paths 16-1, 16-2, e.g., where the paths belong to different cell groups. The multiple "paths" that the radio bearer 16 takes may also be referred to as legs (e.g., radio legs).

Where the RAN CU-12C hosts PDCP and the RAN DUs 12-D1, 12-D2 host RLC, a PDCP entity for the radio bearer 16 at the RAN CU 12-C may be associated with multiple RLC entities, one at each of the RAN DUs 12-D1 and 12-D2. Each RLC entity may correspondingly be associated with a respective RLC bearer, such that the radio bearer 16 is associated with multiple RLC bearers provided by the RAN DUs. Configuration of the radio bearer 16 may thereby involve a lower layer part that comprises the configuration of the RLC bearers.

According to some embodiments, traffic of the radio bearer 16 (e.g., uplink or downlink traffic) is configurable to be transmitted in duplicate over the multiple paths 16-1, 16-2 between the RAN CU 12-C and the wireless device 14. That is, the traffic of the radio bearer 16 is configurable to be duplicated and transmitted over each of the multiple paths 16-1, 16-2. In some embodiments, for example, duplication of the radio bearer's traffic is performed at the PDCP layer at the RAN CU 12-C, e.g., by the PDCP entity of the RAN CU 12-C. In this case, duplication maybe referred to as PDCP duplication and/or packet duplication. In one such embodiment, duplication is of the PDCP protocol data unit (PDU), as opposed to duplication of the PDCP service data unit (SDU), e.g., so as to avoid performing SDU processing twice. In this case, then, the same PDCP PDU is transmitted over the multiple paths 16-1, 16-2, e.g., via two separate RLC/MAC entities at different respective RAN DUs 12-D1, 12-D2.

In some embodiments, duplication of the radio bearer's traffic over the multiple paths 16-1, 16-2 is configurable, e.g., via radio resource control (RRC) and/or at the radio bearer level. Such configuration may for instance account for duplication efficiency changing during the lifetime of the radio bearer 16 and/or the fact that different applications may have different requirements or needs regarding duplication. When duplication is configured for the radio bearer 16 by RRC, for instance, an additional RLC entity and an additional logical channel may be added to the radio bearer 16 to handle the duplicated PDCP PDUs.

Duplication over the multiple paths 16-1, 16-2 may alternatively or additionally be dynamically activated or de-activated, e.g., on a more granular time basis than RRC. In some embodiments, for instance, duplication activation or de-activation may be implemented or controlled at the MAC level, e.g., via a MAC control element (CE) to the wireless device 14. In other embodiments, though, activation or de-activation may be controlled via RRC (e.g., an RRC connection reconfiguration message) or via PDCP (e.g., via a PDCP control PDU).

No matter how duplication is configured and/or activated or de-activated, traffic of the radio bearer 16 may or may not be duplicated over the multiple paths 16-1, 16-2 at any given time. If traffic is not received over one of those paths, it may be because the traffic was transmitted over that path but lost, or because the traffic was never transmitted over that path (e.g., duplication was not configured or it was de-activated). To for example help differentiate these scenarios, one of the paths is designated as a so-called primary path. Traffic is to be transmitted over the primary path irrespective of whether the traffic is also transmitted in duplicate over one or more others of the multiple paths.

According to some embodiments herein, the RAN CU 12-C decides which of the multiple paths 16-1, 16-2 is the primary path for the radio bearer 16. These embodiments thereby designate the RAN CU 12-C as the unit that makes the decision of which path is the primary path, as opposed to a RAN DU making that decision. This may be the case even in embodiments where the primary path decision depends on channel state information indicating channel conditions for the wireless device 14. In such a case, for example, the RAN CU 12-C may receive this channel state information (e.g., from one or more of the RAN DUs) and make the decision based on the received channel state information. Accordingly, even in some embodiments where the RAN DUs are the units that setup respective RLC bearers for duplication and even where the RAN DUs are "closer" to the wireless device 14 so as to have more ready access to channel state information, the RAN CU 12-C nonetheless centrally decides which of the paths 16-1, 16-2 is the primary path. In some embodiments, this may advantageously avoid ambiguity regarding which the of paths is the primary path and/or which of the RAN DUs serves that primary path.

In one or more embodiments as shown in FIG. 1, the RAN CU 12-C transmits control signaling 18 indicating the primary path 16-P decided on by the RAN CU 12-C. In some embodiments, for example, each path may be identified (at least in part) by a logical channel identity (LCID) that identifies a logical channel and a corresponding RLC bearer hosted by a certain RAN DU. In fact, in one embodiment, each RAN DU 12-D1, 12-D2 transmits information indicating which path that RAN DU serves, e.g., in the form of a LCID. In these and other embodiments, then, the control signaling 18 may indicate the primary path 16-P by including an LCID that identifies a logical channel and corresponding RLC bearer hosted by the RAN DU that serves the primary path.

In some embodiments, the RAN CU 12-C transmits the control signaling 18 to the wireless device 14. In one such embodiment, the control signaling 18 is included in an RRC message. The RRC message may for instance configure PDCP parameters for the radio bearer 16. More specifically, the RRC message may include a PDCP-Config information element with a primaryPath field. The primaryPath field may indicate the cell group ID and LCID of the primary RLC entity, e.g., hosted by the RAN DU that serves the primary path.

Alternatively or additionally, the RAN CU 12-C may transmit control signaling to one or more of the RAN DUs 12-D1, 12-D2 (e.g., in a context setup request message) indicating whether or not the RAN DU serves the primary path 16-P. This control signaling may be the control signaling 18 shown in FIG. 1 or may be other signaling not shown. In one embodiment, for instance, the signaling indicates whether or not the RAN DU serves the primary path 16-P by indicating the primary path 16-P, e.g., so as to enable the RAN DU to know from the signaling whether or not the RAN DU serves that path. In other embodiments, the control signaling indicates whether or not the RAN DU serves the primary path 16-P as a flag, Boolean, or other indicator, without necessarily identifying the primary path itself. Regardless of the form of the signaling to a RAN DU, the RAN DU in some embodiments determines, based on the received signaling, whether to monitor for inactivity on the path that the RAN DU serves and/or whether to trigger an inactivity notification for detected inactivity on the path that the RAN DU serves.

In still other embodiments, the RAN CU 12-C may be a CU for the user plane, with the CU for the control plane being separate. In this case, the control signaling 18 may alternatively or additionally be transmitted to the CU for the control plane (not shown).

In some embodiments, the decision of the primary path is associated with a decision of which of the RAN DUs 12-D1, 12-D2 is to be responsible for activating and/or de-activating duplication of traffic over the multiple paths. For example, in some embodiments, the RAN DU that serves the primary path is the RAN DU that is responsible for such activation and/or de-activation. Accordingly, in some embodiments, the control signaling 18 may effectively indicate both the primary path 16-P as well as which RAN DU is responsible for activation and/or deactivation of duplication. The decision of which RAN DU is responsible may thereby also be made by the RAN CU 12-C.

Figure 2:
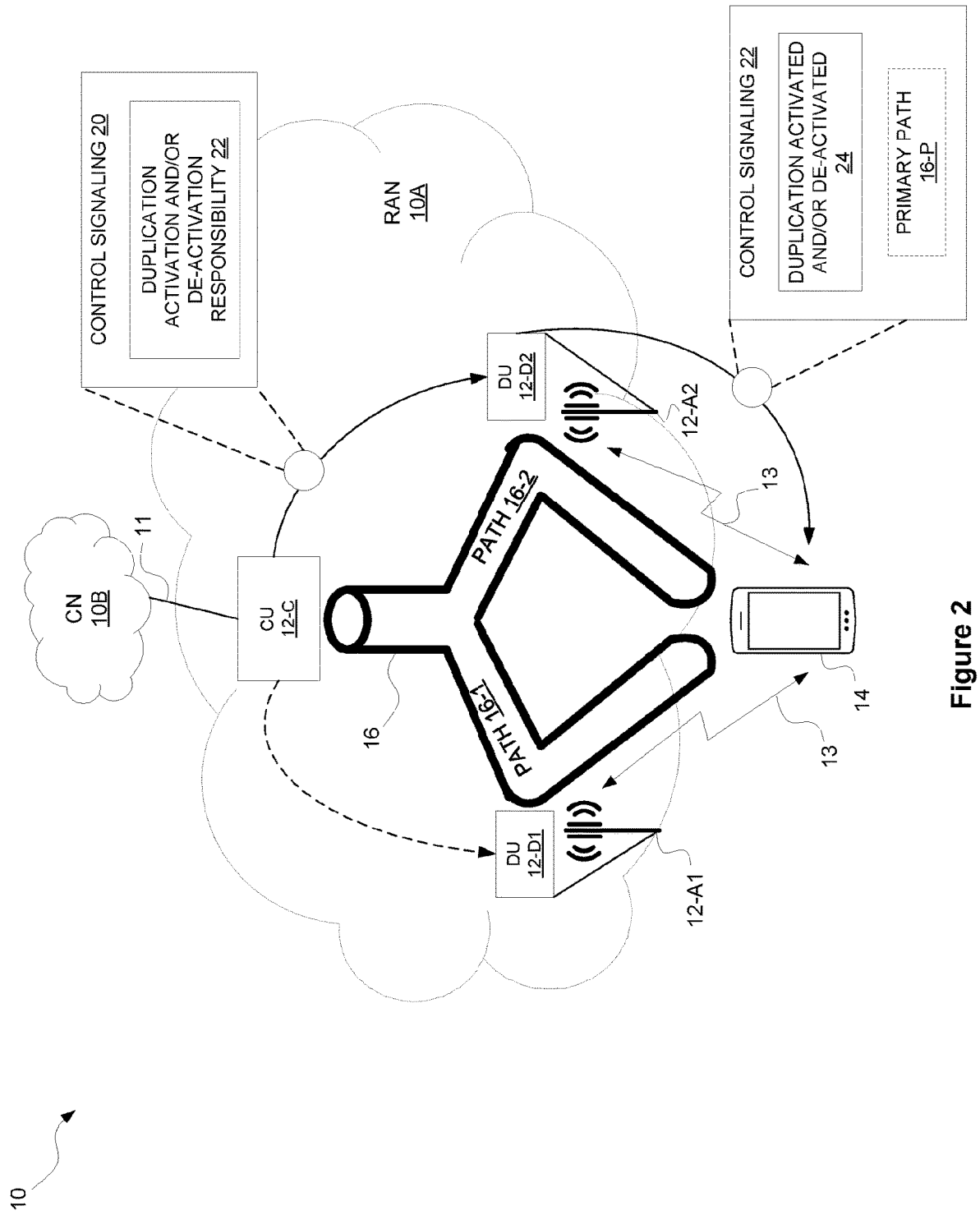
FIG. 2 is a block diagram of a wireless communication system with a radio access network (RAN) central unit and RAN distributed units according to other embodiments.

FIG. 2 illustrates other embodiments where the RAN CU 12-C indicates responsibility for activation and/or de-activation with other control signaling 20. In particular, the RAN CU 12-C decides which of the RAN DUs 12-D1, 12-D2 is to be responsible for activating and/or de-activating duplication of traffic of the radio bearer 16 over the multiple paths 16-1, 16-2. This may be the case even in embodiments where the decision depends on channel state information indicating channel conditions for the wireless device 14. In such a case, for example, the RAN CU 12-C may receive this channel state information (e.g., from one or more of the RAN DUs) and make the decision based on the received channel state information.

Regardless of how the RAN CU 12-C makes the decision, the RAN CU 12-C then transmits control signaling 20 to each of one or more of the RAN DUs 12-D1, 12-D2 indicating whether or not the RAN DU is responsible for activating and/or de-activating duplication of traffic of the radio bearer 16 over the multiple paths 16-1, 16-2. The control signaling 20 as shown for instance includes a duplication activation and/or de-activation responsibility field 22 that explicitly or implicitly indicates this.

A RAN DU correspondingly configures itself to take on responsibility or for activating and/or de-activating duplication or to be relieved from that responsibility according to the control signalling 20. Where the responsible RAN DU, shown in FIG. 2 as RAN DU 12-D2, activates or de-activates duplication, the RAN DU may correspondingly transmit control signalling 22 to the wireless device 14 indicating whether or not duplication is activated or de-activated. The control signalling 22 may for instance include a field 24 indicating this.

In some embodiments, the control signalling 22 is in the form of a duplication activation/deactivation MAC CE. In one such embodiment, the MAC CE may include multiple fields, with each field indicating the activation/deactivation status of duplication of a respective radio bearer, among the radio bearers configured with duplication. In these and other embodiments, then, the control signalling 22 may need to indicate the activation/deactivation status of duplication for multiple radio bearers, even those for which the RAN DU is not responsible for deciding such status.

Accordingly, in some embodiments, the RAN CU 12-C receives from each RAN DU responsible for activating or de-activating duplication for a given radio bearer, control signalling indicating whether or not duplication is activated for that radio bearer. The RAN CU 12-C then relays that information to each other RAN DU responsible for activation or deactivation of duplication for at least one radio bearer. In other embodiments, rather than receiving this information for the RAN DUs, the RAN CU 12-C detects or otherwise infers the activation/deactivation status of duplication for different radio bearers. Where the traffic is uplink traffic, for instance, the RAN CU 12-C may for instance do so based on whether or not the RAN CU 12-C has received duplicated traffic at least a threshold number of times (e.g., after duplicate discard).

In still other embodiments, the RAN CU 12-C makes the decision of whether to activate or de-activate duplication of traffic of the radio bearer 16 over the multiple paths 16-1, 16-2, i.e., rather than just choosing to which of the RAN DUs to assign the responsibility for that decision. This may be the case even in embodiments where the decision depends on channel state information indicating channel conditions for the wireless device 14. In such a case, for example, the RAN CU 12-C may receive this channel state information (e.g., from one or more of the RAN DUs) and make the decision based on the received channel state information.

Figure 3:
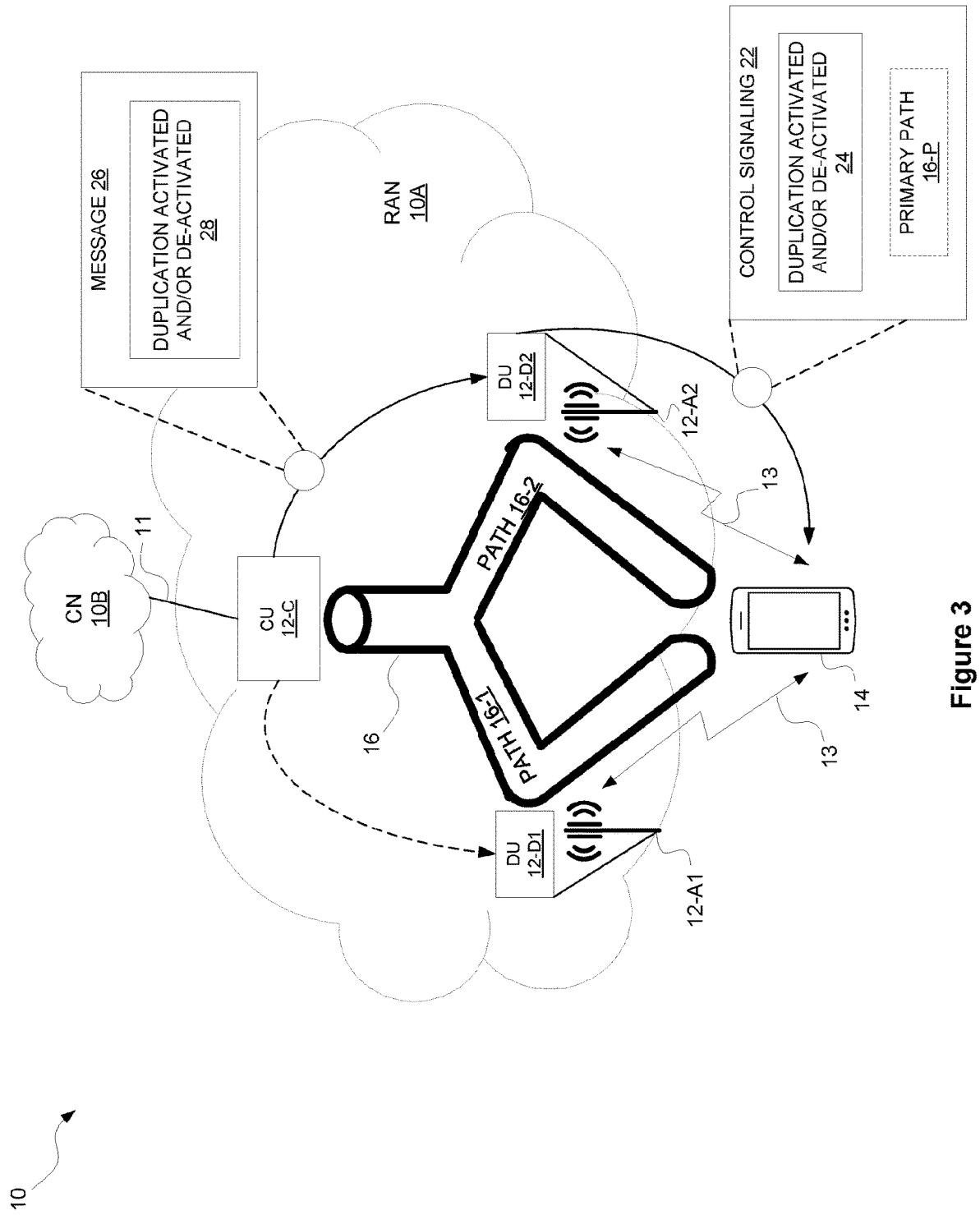
FIG. 3 is a block diagram of a wireless communication system with a radio access network (RAN) central unit and RAN distributed units according to yet other embodiments.

FIG. 3 illustrates an example of such embodiments. As shown in FIG. 3, the RAN CU 12-C decides whether to activate or de-activate duplication of traffic of the radio bearer 16 over the multiple paths 16-1, 16-2. The RAN CU 12-C then transmits to each of one or more of the RAN DUs 12-D1, 12-D2 a message 26 indicating whether duplication of the traffic of the radio bearer 16 is to be activated or de-activated in accordance with that decision. As shown in FIG. 3, for instance, the message 26 may include a field 28 indicating whether duplication is to be activated or de-activated. The message 26 in some embodiments additionally or alternatively requests or commands the RAN DU to transmit to the wireless device 14 control signaling 22 (e.g., the Duplication Activation/Deactivation MAC CE) indicating whether duplication of the traffic of the radio bearer 16 is to be activated or de-activated.

In some embodiments, the RAN CU 12-C may be a RAN CU for the user plane and/or host a PDCP. In these and other embodiments, the RAN CU 12-C may decide activation or de-activation of duplication for the radio bearer 16 based at least in part on receiving a message from a RAN CU for the control plane (not shown) indicating that the RAN CU 12-C is responsible for this decision. The message may be for instance a bearer context setup request message.

In at least some embodiments as shown in FIGS. 2 and 3, the control signaling 22 transmitted by a RAN DU is configurable to explicitly or implicitly indicate the primary path 16-P, e.g., as decided by the RAN CU 12-C. Where the indication is only implicit, for instance, the wireless device 14 may be configured to infer based on the control signaling 22 that the RAN UE from which the control signaling 22 is received serves the primary path 16-P, e.g., at least where the control signalling 22 de-activates duplication.

Figure 4:
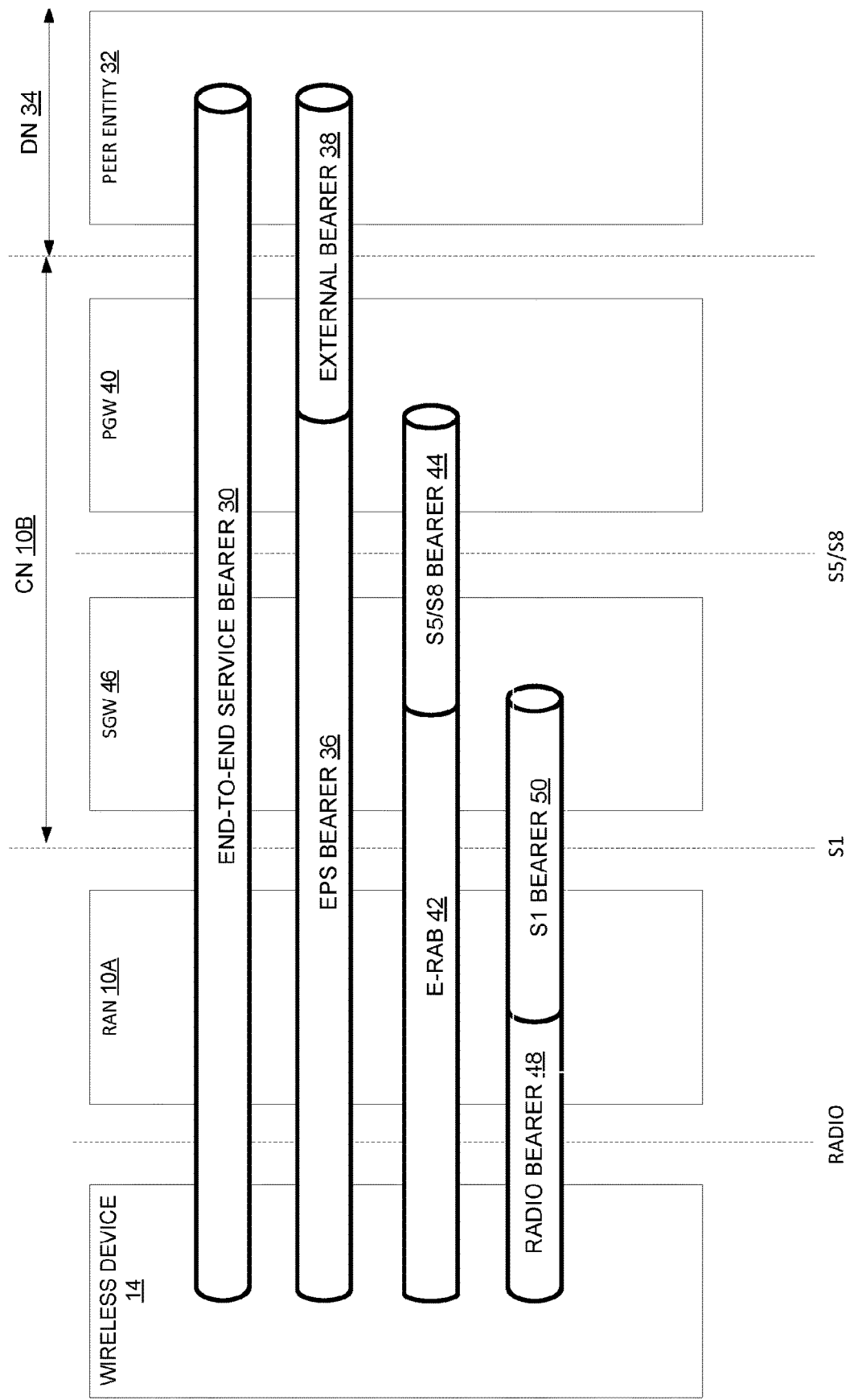
FIG. 4 is a block diagram of bearers in a wireless communication system according to some embodiments.

FIG. 4 illustrates a context for at least some embodiments where the system 10 is a Long Term Evolution (LTE) system or other system that uses LTE-based interfaces. As shown, an end-to-end service bearer 30 is established between a wireless device 14 and a peer entity 32 in a data network (DN) 34 such as the Internet. The end-to-end service bearer 30 is realized by an Evolved Packet System (EPS) bearer 36 and an external bearer 38. An EPS bearer 36 is a virtual connection between the wireless device 14 and a packet data network gateway (PGW) 40 in the core network 10B. An EPS bearer 36 uniquely identifies traffic flows that receive common QoS treatment between the wireless device 14 and the PGW 40. For example, an EPS bearer 36 has a QoS class identifier (QCI) that identifies a QoS class of the EPS bearer 36, with different QoS classes having different QoS requirements (e.g., in terms of scheduling priority, packet delay budget, packet error loss rate, etc).

The EPS bearer 36 is in turn realized as a combination of an E-UTRAN radio access bearer (E-RAB) 42 and an S5/S8 bearer 44. The S5/S8 bearer 44 transports the packets of an EPS bearer 36 between the PWG 40 and a serving gateway (SGW) 46 in the CN 10B. The E-RAB 42 bearer is correspondingly realized as a radio bearer 48 and an S1 bearer 50. The S1 bearer transports packets of an EPS bearer 36 between the RAN 10A and the SGW 46. A radio bearer 48 transports the packets of an EPS bearer between the wireless device 14 and the RAN 10A. The radio bearer 48 may be a data radio bearer (DRB) or a signalling radio bearer (SRB).

In this context of FIG. 4, a radio bearer 16 as described in FIGS. 1-3 and elsewhere herein may be a radio bearer 48.

Figure 5:
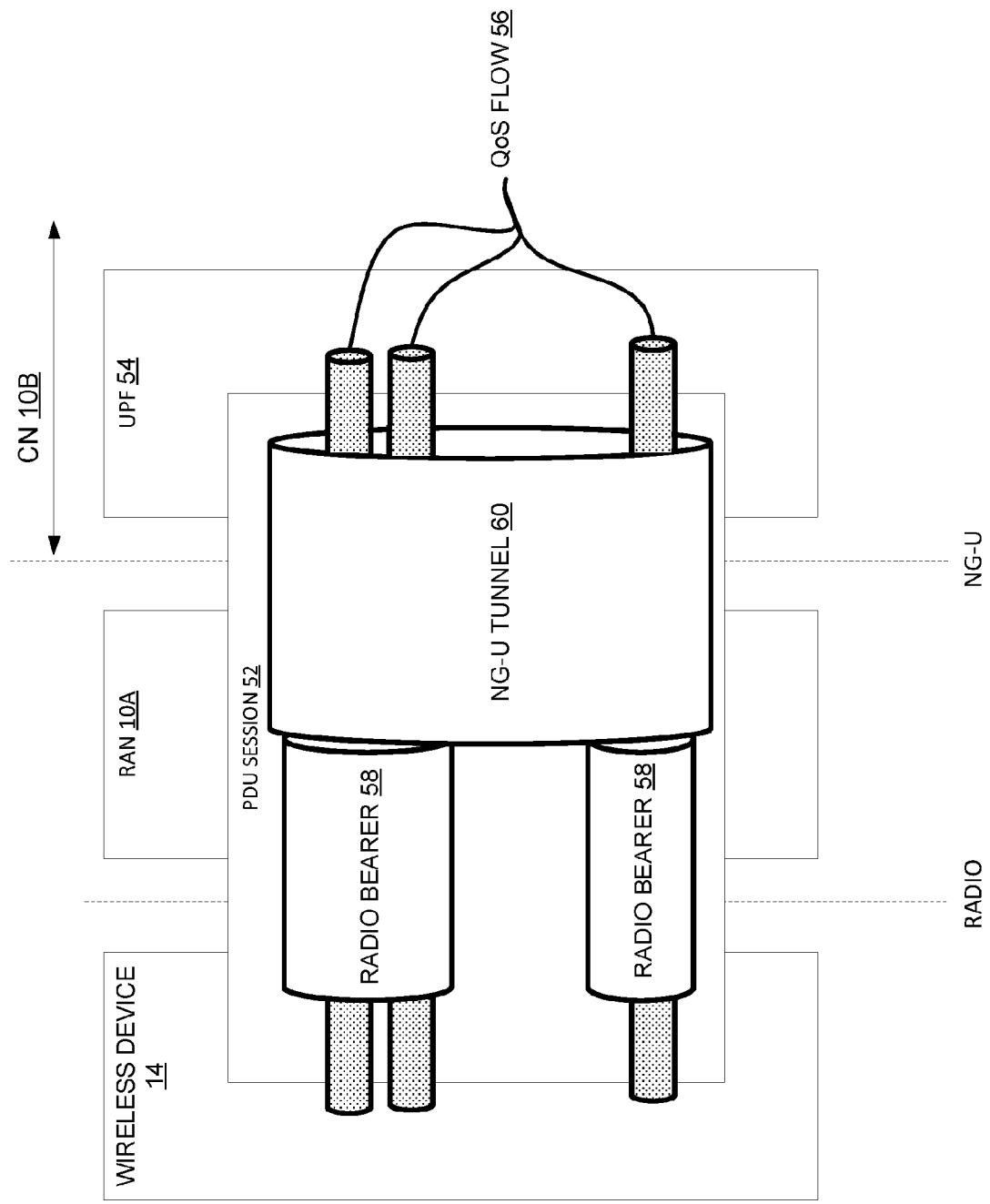
FIG. 5 is a block diagram of bearers in a wireless communication system according to other embodiments.

FIG. 5 illustrates still another context where the system 10 is a 5G or New Radio (NR) system. As shown, a protocol data unit (PDU) session 52 provides PDU connectivity service between a wireless device 14 and a user plane function (UPF) 54 of the CN 10B. A QoS flow 56 is the finest granularity of QoS differentiation in a PDU session 52. User plane traffic with the same QoS flow 56 within a PDU session 52 receives the same traffic forwarding treatment.

One or more radio bearers 58 are established per PDU session 52 for transport of the traffic of one or more QoS flows between the wireless device 14 and the RAN 10A. An NG-U tunnel 60 is established between the RAN 10A and the UPF 54. The RAN 10A maps packets belonging to different PDU sessions for different radio bearers and/or maps multiple QoS flows to a single radio bearer.

In this context of FIG. 5, a radio bearer 16 as described in FIGS. 1-3 and elsewhere herein may be a radio bearer 58.

Figure 6:
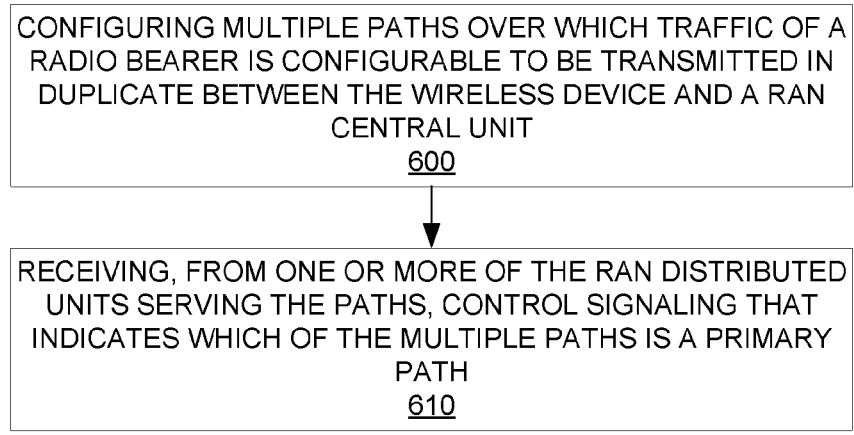
FIG. 6 is a logic flow diagram of a method performed by radio network equipment configured to implement a RAN central unit according to some embodiments.

In view of the above modifications and variations herein, FIG. 6 depicts a method performed by a wireless device 14 configured for use in a wireless communication system 10 that includes a RAN 10A in accordance with particular embodiments. The method includes configuring multiple paths 16-1, 16-2 over which traffic of a radio bearer 16 is configurable to be transmitted in duplicate between the wireless device 14 and a RAN CU 12-C (Block 600). In some embodiments, different RAN DUs 12-D1, 12-D2 serve different respective ones of the multiple paths 16-1, 16-2. The method also includes receiving, from one or more of the RAN DUs serving the paths 16-1, 16-2, control signaling 22 that indicates which of the multiple paths is a primary path 16-P (Block 610). The primary path 16-P may be a path over which the traffic is to be transmitted irrespective of whether the traffic is also transmitted in duplicate over one or more others of the multiple paths.

In some embodiments, the control signalling 22 comprises a medium access control, MAC, control element, CE.

In some embodiments, the control signaling 22 also indicates whether duplication of the traffic of the radio bearer is to be activated or de-activated.

In some embodiments, the one or more RAN distributed units from which the control signaling 22 is received includes a RAN distributed unit that serves one of the paths other than the primary path 16-P.

Figure 7:
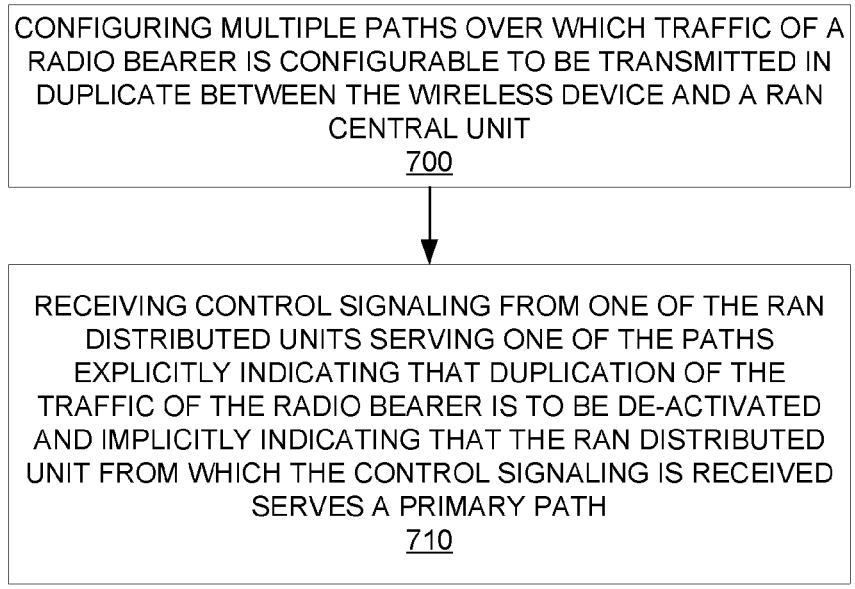
FIG. 7 is a logic flow diagram of a method performed by radio network equipment configured to implement a RAN central unit according to other embodiments.

FIG. 7 depicts a method performed by a wireless device 14 configured for use in a wireless communication system 10 that includes a RAN 10A in accordance with particular embodiments. The method includes configuring multiple paths 16-1, 16-2 over which traffic of a radio bearer 16 is configurable to be transmitted in duplicate between the wireless device 14 and a RAN CU 12-C (Block 700). In some embodiments, different RAN DUs 12-D1, 12-D2 serve different respective ones of the multiple paths 16-1, 16-2. The method also includes receiving control signaling 22 from one of the RAN DUs serving one of the paths explicitly indicating that duplication of the traffic of the radio bearer 16 is to be de-activated and implicitly indicating that the RAN DU from which the control signaling 22 is received serves a primary path 16-P (Block 710). The primary path 16-P may be a path over which the traffic is to be transmitted irrespective of whether the traffic is also transmitted in duplicate over one or more others of the multiple paths.

In some embodiments, the method further comprises inferring based on the received signaling that the RAN distributed unit from which the control signaling is received serves a primary path over which the traffic is to be transmitted irrespective of whether the traffic is also transmitted in duplicate over one or more others of the multiple paths.

In some embodiments, the control signalling 22 comprises a medium access control, MAC, control element, CE.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and wherein duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Figure 8:
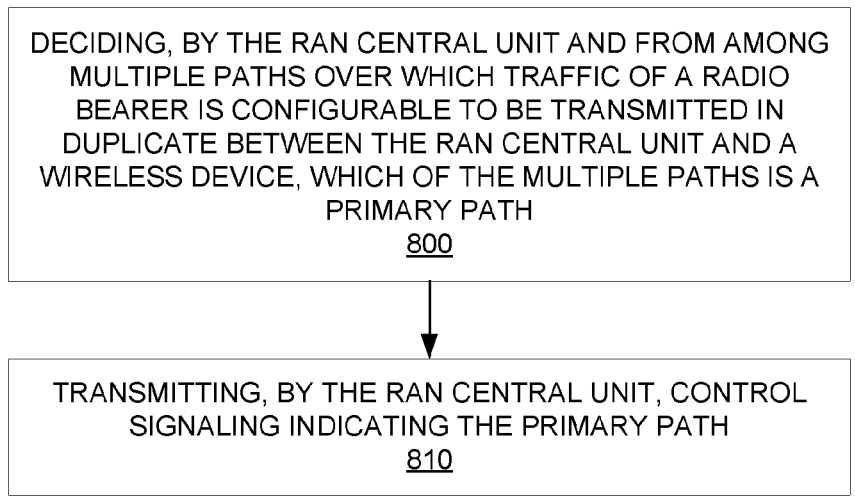
FIG. 8 is a logic flow diagram of a method performed by radio network equipment configured to implement a RAN central unit according to yet other embodiments.

FIG. 8 depicts a method performed by radio network equipment configured to implement a RAN CU 12-C. The method includes deciding, by the RAN CU 12-C and from among multiple paths 16-1, 16-2 over which traffic of a radio bearer 16 is configurable to be transmitted in duplicate between the RAN CU 12-C and a wireless device 14, which of the multiple paths is a primary path 16-P (Block 800). The primary path 16-P may be a path over which the traffic is to be transmitted irrespective of whether the traffic is also transmitted in duplicate over one or more others of the multiple paths. In some embodiments, different RAN DUs 12-D1, 12-D2 serve different respective ones of the multiple paths 16-1, 16-2. The method also includes transmitting, by the RAN CU 12-C, control signaling 18 indicating the primary path 16-P (Block 810).

In some embodiments, the method further comprises receiving information that indicates which path each of the RAN distributed units serves. In this case, the control signalling 18 indicating the primary path includes at least some of the information received from the RAN distributed unit that serves the primary path. For example, the information that indicates which path each of the RAN distributed units serves may include a logical channel identity that identifies a logical channel and a corresponding radio link control, RLC, bearer hosted by the RAN distributed unit.

In some embodiments, the control signalling 18 indicating the primary path includes a logical channel identity that identifies a logical channel and a corresponding radio link control, RLC, bearer hosted by the RAN distributed unit that serves the primary path.

In some embodiments, the control signalling 18 is transmitted to the wireless device and is included in a radio resource control, RRC, message that configures packet data convergence protocol, PDCP, parameters for the radio bearer.

In some embodiments, the RAN central unit is a RAN central unit for a user plane, and wherein the control signaling is transmitted to a RAN central unit for a control plane.

In some embodiments, the method further comprises transmitting control signalling indicating to each of the RAN distributed units serving one of the multiple paths whether or not the RAN distributed unit serves the primary path.

In some embodiments, the method further comprises receiving at the RAN central unit channel state information indicating channel conditions for the wireless device. In this case, said deciding may comprise deciding which of the multiple paths is the primary path based on received channel state information.

In some embodiments, multiple radio bearers are configured between the RAN central unit and the wireless device. In this case, said deciding may comprise deciding which of the multiple paths is the primary path over which traffic of the multiple radio barriers is to be commonly transmitted.

In some embodiments, said deciding comprises deciding, on a radio bearer by radio bearer basis, which of the multiple paths is the primary path over which the traffic of the radio bearer is to be transmitted.

In some embodiments, deciding which of the multiple paths is the primary path comprises deciding which of the RAN distributed units is to be responsible for activating duplication of traffic over the multiple paths, wherein the RAN distributed unit that serves the primary path is responsible for said activating.

In some embodiments, the method further comprises deciding, by the RAN central unit, which of the RAN distributed units is to be responsible for activating duplication of the traffic of the radio bearer over the multiple paths; and transmitting, by the RAN central unit, control signalling to each of one or more of the RAN distributed units indicating whether or not the RAN distributed unit is responsible for activating duplication of the traffic of the radio bearer over the multiple paths.

In some embodiments, the method further comprises receiving at the RAN central unit channel state information indicating channel conditions for the wireless device. In this case, deciding which of the RAN distributed units is to be responsible for activating duplication of the traffic of the radio bearer over the multiple paths may be performed based on the received channel state information.

In some embodiments, the method further comprises transmitting, to a RAN distributed unit responsible for activating duplication of the traffic of the radio bearer over the multiple paths, control signalling indicating whether or not duplication of traffic of a different radio bearer is activated.

In some embodiments, the method further comprises receiving, from a RAN distributed unit responsible for activating duplication of the traffic of the radio bearer over the multiple paths, control signalling indicating whether or not duplication of the traffic of the radio bearer over the multiple paths is activated.

In some embodiments, the traffic is uplink traffic, and the method further comprises detecting whether or not duplication of the traffic of the radio bearer over the multiple paths is activated, based on whether or not the RAN central unit has received duplicated traffic at least a threshold number of times.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Figure 9:
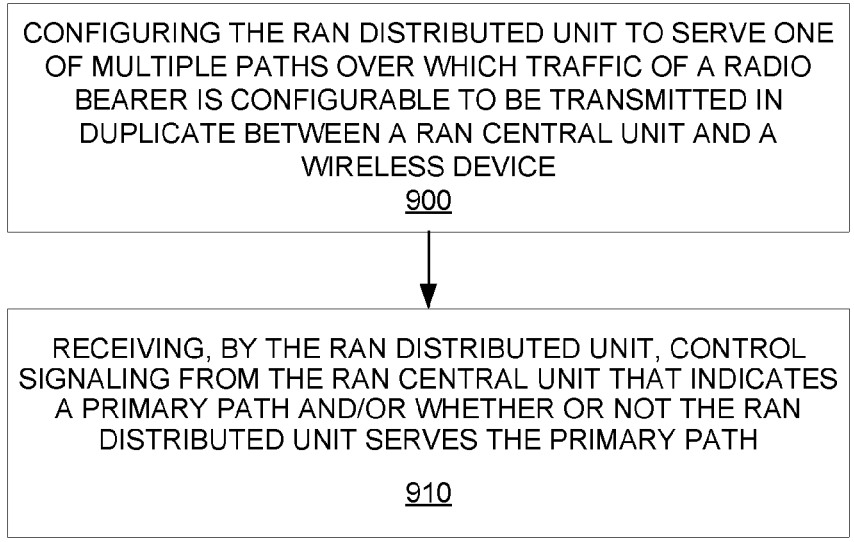
FIG. 9 is a logic flow diagram of a method performed by radio network equipment configured to implement a RAN distributed unit according to some embodiments.

FIG. 9 depicts a method performed by radio network equipment configured to implement a RAN DU 12-D1 or 12-D2. The method includes configuring the RAN DU to serve one of multiple paths 16-1, 16-2 over which traffic of a radio bearer 16 is configurable to be transmitted in duplicate between a RAN CU 12-C and a wireless device 14 (Block 900). In some embodiments, different RAN DUs 12-D1, 12-D2 serve different respective ones of the multiple paths 16-1, 16-2. The method also includes receiving, by the RAN DU, control signaling from the RAN CU 12-C that indicates a primary path 16-P and/or whether or not the RAN DU serves the primary path 16-P (Block 910). The primary path 16-P may be a path over which the traffic is to be transmitted irrespective of whether the traffic is also transmitted in duplicate over one or more others of the multiple paths.

In some embodiments, the method further comprises determining, based on the received signaling, whether to monitor for inactivity on the path that the RAN distributed unit serves and/or whether to trigger an inactivity notification for detected inactivity on the path that the RAN distributed unit serves.

In some embodiments, the control signaling is received in a context setup request message from the RAN central unit.

In some embodiments, the method further comprises transmitting to the RAN central unit information that indicates which one of the paths the RAN distributed unit serves.

In some embodiments, the method further comprises receiving control signaling from the RAN central unit indicating whether or not the RAN distributed unit is responsible for activating duplication of the traffic of the radio bearer over the multiple paths, and configuring the RAN distributed unit to take on responsibility for activating said duplication or to be relieved from that responsibility according to the control signalling.

In some embodiments, the method further comprises receiving, from the RAN central unit, control signalling indicating whether duplication of traffic of a different radio bearer is to be activated or de-activated. In one embodiment, for example, the method further comprises deciding whether to activate or de-activate duplication of the traffic of the radio bearer over the multiple paths; and transmitting to the wireless device control signaling indicating: (i) whether duplication of the traffic of the radio bearer is to be activated or de-activated in accordance with said deciding; and (ii) whether duplication of the traffic of the different radio bearer is to be activated or de-activated in accordance with the received control signaling.

In some embodiments, the method further comprises transmitting to the RAN central unit control signalling indicating whether or not duplication of the traffic of the radio bearer over the multiple paths is to be activated or de-activated.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Figure 10:
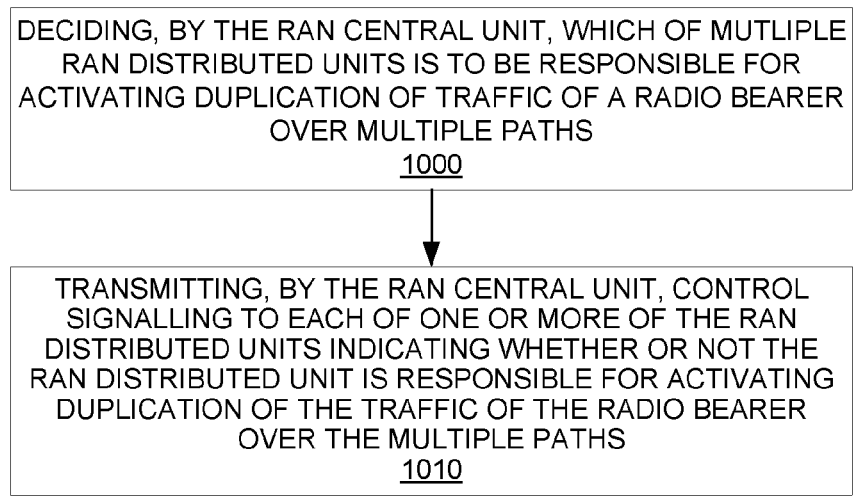
FIG. 10 is a logic flow diagram of a method performed by radio network equipment configured to implement a RAN central unit according to still other embodiments.

FIG. 10 depicts a method performed by radio network equipment configured to implement a RAN CU 12-C. The method includes deciding, by the RAN CU 12-C, which of multiple RAN DUs 12-D1, 12-D2 is to be responsible for activating duplication of traffic of a radio bearer 16 over multiple paths 16-1, 16-2 (Block 1000). In some embodiments, different RAN DUs 12-D1, 12-D2 serve different respective ones of the multiple paths 16-1, 16-2. The method also includes transmitting, by the RAN CU 12-C, control signalling 20 to each of one or more of the RAN DUs 12-D1, 12-D2 indicating whether or not the RAN DU is responsible for activating duplication of the traffic of the radio bearer 16 over the multiple paths 16-1, 16-2 (Block 1010).

In some embodiments, deciding which of the RAN distributed units is to be responsible for activating duplication of the traffic of the radio bearer over the multiple paths comprises deciding which of the multiple paths is the primary path over which the traffic is to be transmitted irrespective of whether the traffic is also transmitted in duplicate over one or more others of the multiple paths. Here, the RAN distributed unit that serves the primary path is responsible for said activating.

In some embodiments, the method further comprises receiving at the RAN central unit channel state information indicating channel conditions for the wireless device. In this case, deciding which of the RAN distributed units is to be responsible for activating duplication of the traffic of the radio bearer over the multiple paths is performed based on the received channel state information.

In some embodiments, the method further comprises transmitting, to a RAN distributed unit responsible for activating duplication of the traffic of the radio bearer over the multiple paths, control signalling indicating whether or not duplication of traffic of a different radio bearer is activated.

In some embodiments, the method further comprises receiving, from a RAN distributed unit responsible for activating duplication of the traffic of the radio bearer over the multiple paths, control signalling indicating whether or not duplication of the traffic of the radio bearer over the multiple paths is activated.

In some embodiments, the traffic is uplink traffic, and the method further comprises detecting whether or not duplication of the traffic of the radio bearer over the multiple paths is activated, based on whether or not the RAN central unit has received duplicated traffic at least a threshold number of times.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Figure 11:
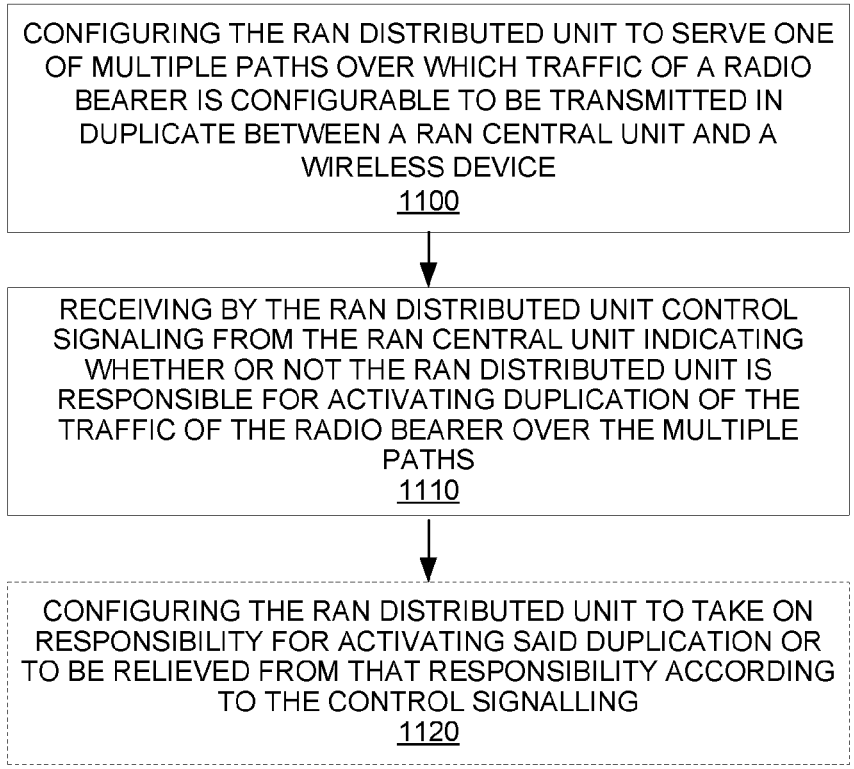
FIG. 11 is a logic flow diagram of a method performed by radio network equipment configured to implement a RAN distributed unit according to other embodiments.

FIG. 11 depicts a method performed by radio network equipment configured to implement a RAN DU 12-D1 or 12-D2. The method includes configuring the RAN DU to serve one of multiple paths 16-1, 16-2 over which traffic of a radio bearer 16 is configurable to be transmitted in duplicate between a RAN CU 12-C and a wireless device 14 (Block 1100). In some embodiments, different RAN DUs 12-D1, 12-D2 serve different respective ones of the multiple paths 16-1, 16-2. The method also includes receiving, by the RAN DU, control signaling 20 from the RAN CU 12-C that indicates whether or not the RAN DU is responsible for activating duplication of the traffic of the radio bearer 16 over the multiple paths 16-1, 16-2 (Block 1110). In some embodiments, the method also includes configuring the RAN DU to take on responsibility for activating said duplication or to be relieved from that responsibility according to the control signalling (Block 1120).

In some embodiments, the method further comprises transmitting to the RAN central unit information that indicates which one of the paths the RAN distributed unit serves.

In some embodiments, the method further comprises receiving, from the RAN central unit, control signalling indicating whether duplication of traffic of a different radio bearer is to be activated or de-activated.

In some embodiments, the method further comprises deciding whether to activate or de-activate duplication of the traffic of the radio bearer over the multiple paths; and transmitting to the wireless device control signaling indicating: (i) whether duplication of the traffic of the radio bearer is to be activated or de-activated in accordance with said deciding; and (ii) whether duplication of the traffic of the different radio bearer is to be activated or de-activated in accordance with the received control signaling.

In some embodiments, the method further comprises transmitting to the RAN central unit control signalling indicating whether duplication of the traffic of the radio bearer over the multiple paths is to be activated or de-activated.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Figure 12:
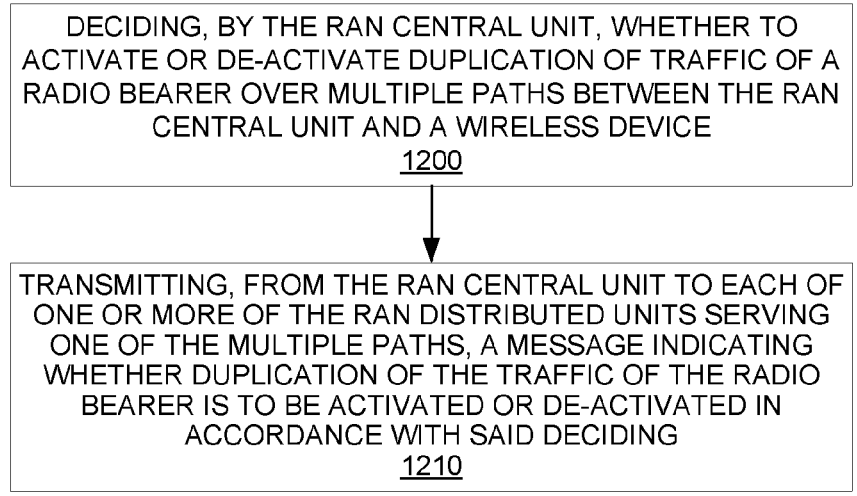
FIG. 12 is a logic flow diagram of a method performed by radio network equipment configured to implement a RAN central unit according to still other embodiments.

FIG. 12 depicts a method performed by radio network equipment configured to implement a RAN CU 12-C. The method includes deciding, by the RAN CU 12-C, whether to activate or de-activate duplication of traffic of a radio bearer 16 over multiple paths 16-1, 16-2 between the RAN CU 12-C unit and a wireless device 14 (Block 1200). In some embodiments, different RAN DUs 12-D1, 12-D2 serve different respective ones of the multiple paths 16-1, 16-2. The method also includes transmitting, from the RAN CU 12-C to each of one or more of the RAN DUs 12-D1, 12-D2 serving one of the multiple paths 16-1, 16-2, a message 26 indicating whether duplication of the traffic of the radio bearer 16 is to be activated or de-activated in accordance with said deciding (Block 1210).

In some embodiments, the message requests or commands each of the one or more RAN distributed units to which the message is sent to transmit to the wireless device control signaling indicating whether duplication of the traffic of the radio bearer is to be activated or de-activated in accordance with said deciding.

In some embodiments, the RAN central unit is a RAN central unit for a user plane.

In some embodiments, the RAN central unit hosts a packet data convergence protocol, PDCP.

In some embodiments, the RAN central unit is a RAN central unit for a user plane, and the method further comprises receiving a message from a RAN central unit for a control plane indicating that the RAN central unit for the user plane is responsible for deciding whether to activate or de-activate duplication of the traffic of the radio bearer.

In some embodiments, the message from the RAN central unit for the control plane comprises a bearer context setup request message.

In some embodiments, the method further comprises receiving at the RAN central unit channel state information indicating channel conditions for the wireless device, and wherein said deciding is performed based on received channel state information.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Figure 13:
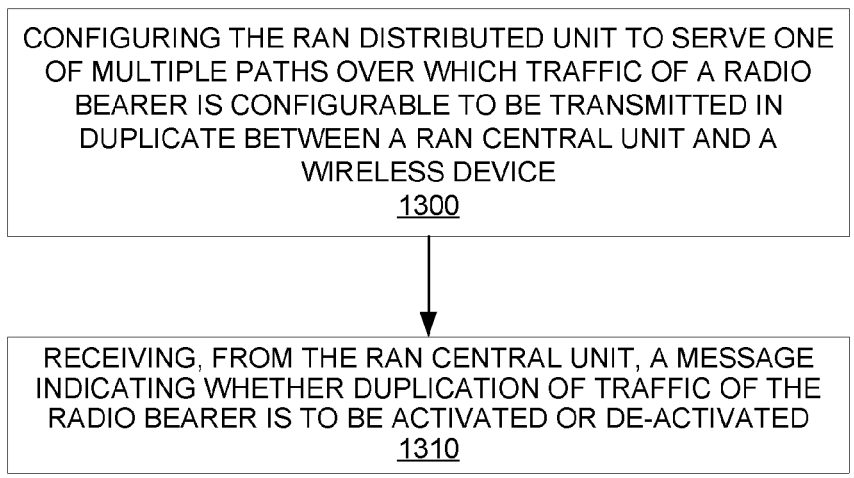
FIG. 13 is a logic flow diagram of a method performed by radio network equipment configured to implement a RAN central unit according to yet other embodiments.

FIG. 13 depicts a method performed by radio network equipment configured to implement a RAN DU 12-D1 or 12-D2. The method includes configuring the RAN DU to serve one of multiple paths 16-1, 16-2 over which traffic of a radio bearer 16 is configurable to be transmitted in duplicate between a RAN CU 12-C and a wireless device 14 (Block 1300). In some embodiments, different RAN DUs 12-D1, 12-D2 serve different respective ones of the multiple paths 16-1, 16-2. The method also includes receiving, from the RAN CU 12-C, a message 26 indicating whether duplication of traffic of a radio bearer 16 is to be activated or de-activated (Block 1310).

In some embodiments, the message requests or commands the RAN distributed unit to transmit to a wireless device control signaling indicating whether duplication of traffic of a radio bearer is to be activated or de-activated, and the method further comprises transmitting the control signaling to the wireless device in accordance with the received message.

In some embodiments, wherein the RAN central unit is a RAN central unit for a user plane.

In some embodiments, the RAN central unit hosts a packet data convergence protocol, PDCP.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Figure 14:
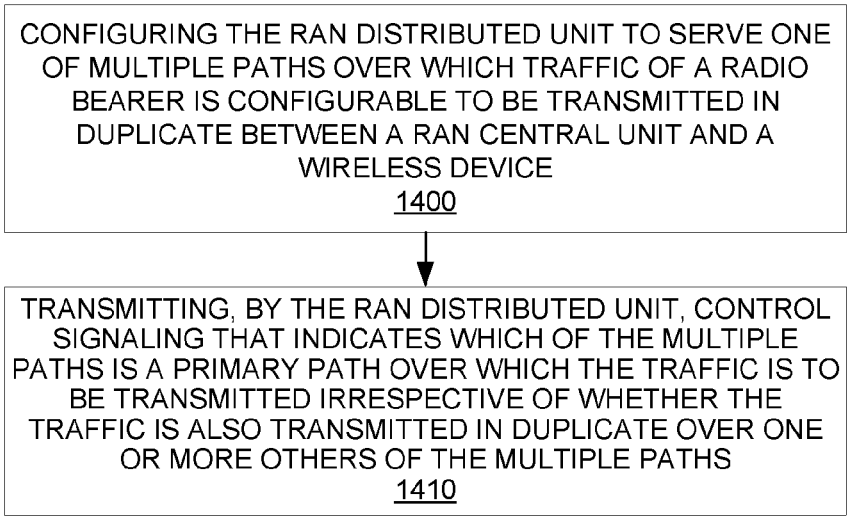
FIG. 14 is a logic flow diagram of a method performed by radio network equipment configured to implement a RAN distributed unit according to still other embodiments.

FIG. 14 depicts a method performed by radio network equipment configured to implement a RAN DU 12-D1 or 12-D2. The method includes configuring the RAN DU to serve one of multiple paths 16-1, 16-2 over which traffic of a radio bearer 16 is configurable to be transmitted in duplicate between a RAN CU 12-C and a wireless device 14 (Block 1400). In some embodiments, different RAN DUs 12-D1, 12-D2 serve different respective ones of the multiple paths 16-1, 16-2. The method also includes transmitting, by the RAN DU, control signaling 22 that indicates which of the multiple paths is a primary path 16-P (Block 1410). The primary path 16-P may be a path over which the traffic is to be transmitted irrespective of whether the traffic is also transmitted in duplicate over one or more others of the multiple paths.

In some embodiments, the control signalling 22 comprises a medium access control, MAC, control element, CE.

In some embodiments, the control signaling 22 also indicates whether duplication of the traffic of the radio bearer is to be activated or de-activated.

In some embodiments, the RAN distributed unit serves one of the paths other than the primary path 16-P.

In some embodiments, the traffic is uplink traffic.

In some embodiments, the RAN central unit terminates an interface to a core network of a wireless communication system and each RAN distributed unit terminates a radio interface to the wireless device.

In some embodiments, the RAN central unit hosts a packet data convergence protocol, PDCP, and duplication of the traffic comprises duplication at a PDCP layer such that PDCP protocol data units, PDUs, are transmitted in duplicate over the multiple paths.

In some embodiments, each RAN distributed unit hosts a radio link control, RLC, protocol.

In some embodiments, the multiple paths are associated with different respective radio link control, RLC, bearers.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 15:
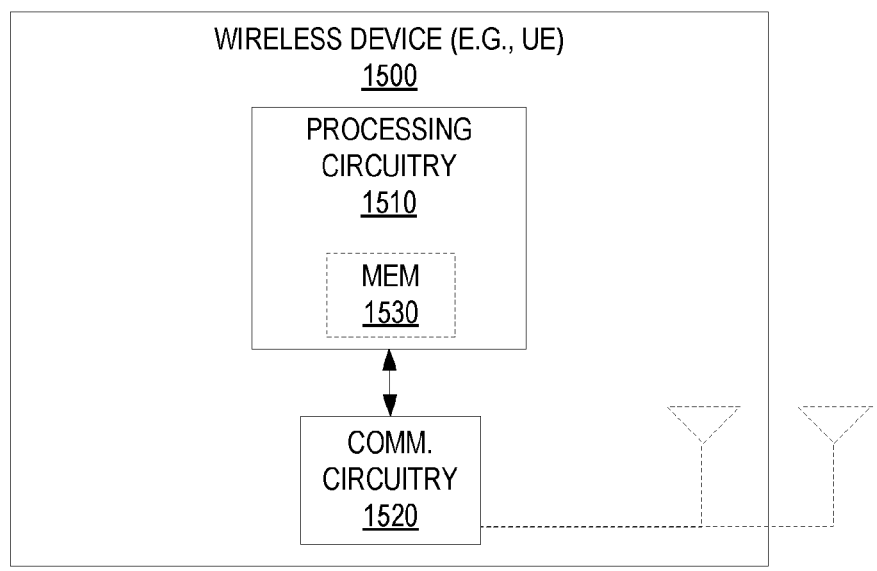
FIG. 15 is a block diagram of a wireless device according to some embodiments.

FIG. 15 for example illustrates a wireless device 1500 as implemented in accordance with one or more embodiments. As shown, the wireless device 1500 includes processing circuitry 1510 and communication circuitry 1520. The communication circuitry 1520 (e.g., radio circuitry) is configured to transmit and/or receive information to and/or from one or more other nodes, e.g., via any communication technology. Such communication may occur via one or more antennas that are either internal or external to the wireless device 1500. The processing circuitry 1510 is configured to perform processing described above, such as by executing instructions stored in memory 1530. The processing circuitry 1510 in this regard may implement certain functional means, units, or modules.

Figure 16:
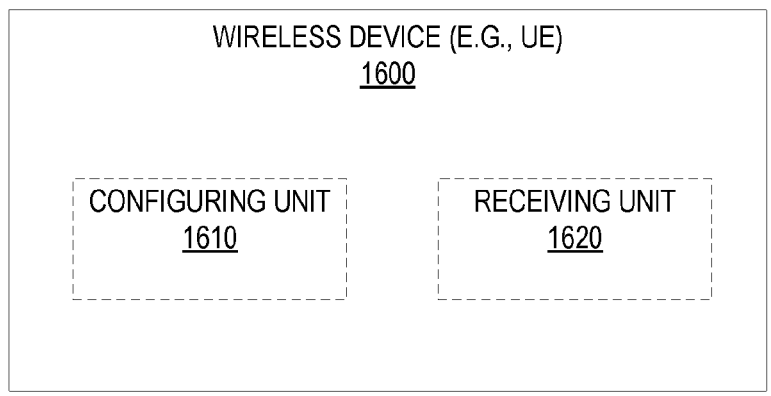
FIG. 16 is a block diagram of a wireless device according to other embodiments.
Figure 20:
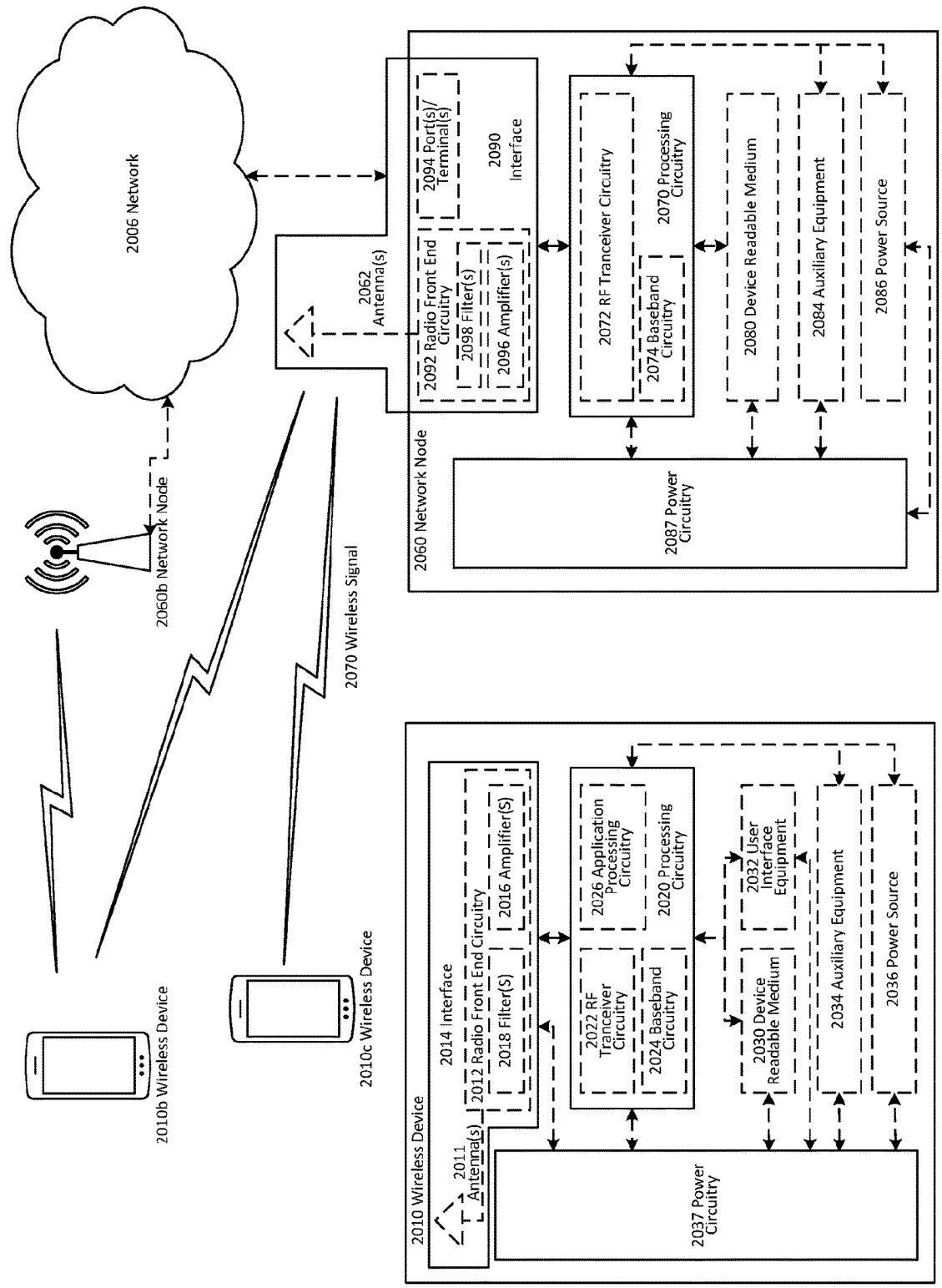
FIG. 20 is a block diagram of a wireless communication network according to some embodiments.

FIG. 16 illustrates a schematic block diagram of an wireless device 1600 in a wireless network according to still other embodiments (for example, the wireless network shown in FIG. 20). As shown, the wireless device 1600 implements various functional means, units, or modules, e.g., via the processing circuitry 1510 in FIG. 15 and/or via software code. These functional means, units, or modules, e.g., for implementing the method(s) herein, include for instance a configuring unit 1610 and a receiving unit 1620 for implementing the configuring and receiving steps in FIGS. 6 and/or 7.

Figure 17:
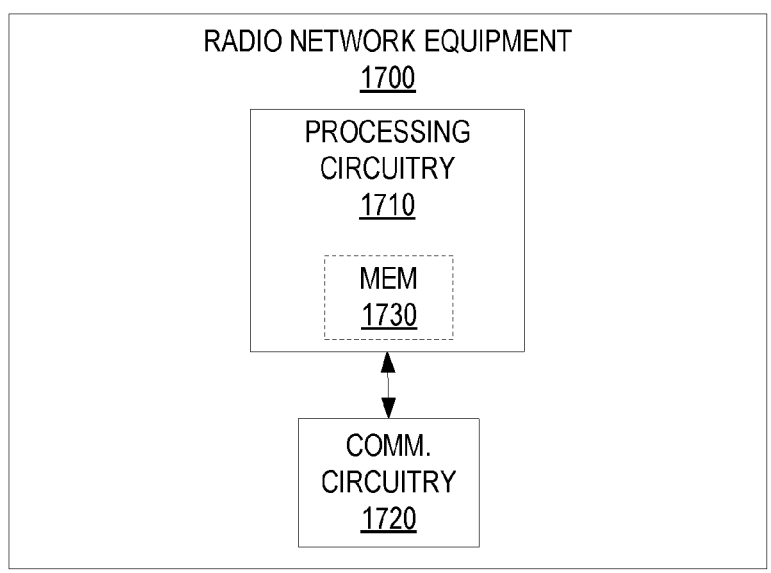
FIG. 17 is a block diagram of radio network equipment according to some embodiments.

FIG. 17 illustrates radio network equipment 1700 as implemented in accordance with one or more embodiment. The radio network equipment 1700 may for instance implement the RAN CU 12-C or a RAN DU 12-D1 or 12-D2. As shown, the radio network equipment 1700 includes processing circuitry 1710 and communication circuitry 1720. The communication circuitry 1720 is configured to transmit and/or receive information to and/or from one or more other nodes, e.g., via any communication technology. The processing circuitry 1710 is configured to perform processing described above, such as by executing instructions stored in memory 1730. The processing circuitry 1710 in this regard may implement certain functional means, units, or modules.

Note that the circuitry of the radio network node 1700 may be co-located or distributed across multiple nodes.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 18:
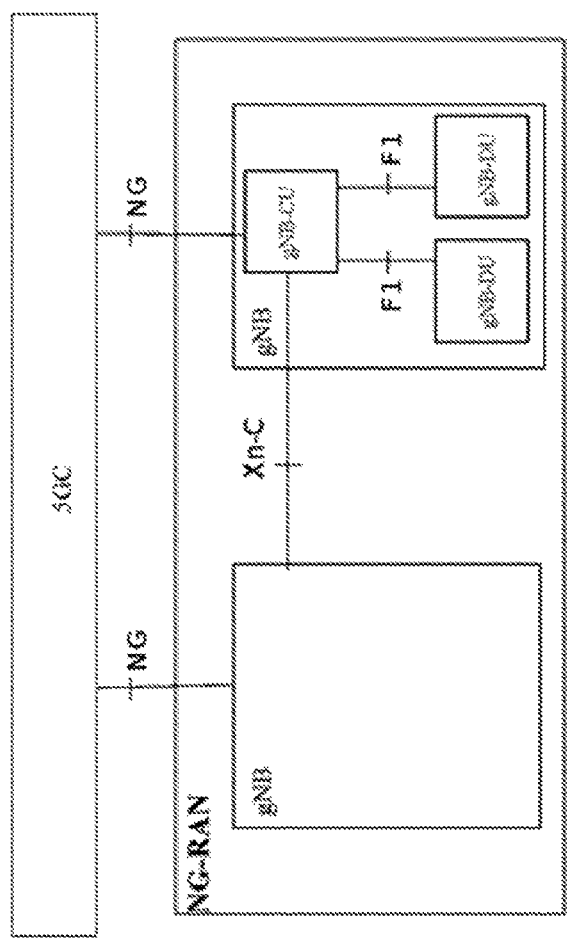
FIG. 18 is a block diagram of a Next Generation (NG) system according to some embodiments.

The current 5G RAN architecture is described in 3GPP Technical Specification (TS) 38.401 as shown in FIG. 18. The NG architecture can be further described as follows. The NG-RAN consists of a set of gNBs connected to the 5G Core (5GC) through the NG. A gNB can support Frequency Division Duplexing (FDD) mode, Time Division Duplexing (TDD) mode or dual mode operation. gNBs can be interconnected through the Xn interface. A gNB may consist of a gNB-CU and gNB-DUs. A gNB-CU and a gNB-DU are connected via F1 logical interface. One gNB-DU is connected to only one gNB-CU.

NG, Xn and F1 are logical interfaces. For NG-RAN, the NG and Xn-C interfaces for a gNB consisting of a gNB-CU and gNB-DUs terminate in the gNB-CU. For E-UTRAN New Radio Dual Connectivity (EN-DC), the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all Access and Mobility Functions (AMFs) within an AMF Region. The AMF Region is defined in 3GPP TS 23.501.

A similar architecture can be foreseen in a 4G network too, either as future 3GPP development or a proprietary product development. The concept of CU, DU and F1 interface can be applied to a 4G eNB also.

The following description will exemplified embodiments herein with reference to a gNB (as well as gNB-CU and gNB-DU), but the exemplified embodiments are equally extendable and applicable to an eNB. Likewise, embodiments may be exemplified in terms of F1 as per 3GPP standardization, but embodiments are equally extendable and applicable to any possible proprietary interface between eNB-DU and eNB-CU.

Consider now Multi-RAT Dual Connectivity (MR-DC). The first drop of LTE-NR (New Radio) DC (also referred to as LTE-NR tight interworking, or EN-DC) has been standardized for rel-15 and further enhancements are being made. The major changes in EN-DC as compared to LTE DC are: (i) The introduction of split bearer from the secondary node (SN) (known as SCG split bearer); (ii) The introduction of split bearer for Radio Resource Control (RRC); and (iii) The introduction of a direct RRC from the SN (also referred to as Secondary Cell Group, SCG, signaling radio bearer, SRB).

The following terminologies are used throughout this text to differentiate different dual connectivity scenarios. Dual Connectivity (DC) refers to LTE DC (i.e. both master node, MN, and secondary node, SN, employ LTE). EN-DC refers to LTE-NR dual connectivity where LTE is the master and NR is the secondary, where LTE is connected to the Evolved Packet Core (EPC). NGEN-DC refers to LTE-NR dual connectivity where LTE is the master and NR is the secondary, where the LTE is connected to 5GC instead of EPC. NE-DC refers to LTE-NR dual connectivity where NR is the master and LTE is the secondary. NR-DC (or NR-NR DC) refers to DC where both MN and SN employ NR. MR-DC (multi-RAT DC) is a generic term to describe where the MN and SN employ different radio access technologies (RATs) (EN-DC and NE-DC are two different example cases of MR-DC).

Note that the SN is sometimes referred to as SgNB (where gNB is an NR base station), and the MN as MeNB, in case the LTE is the master node and NR is the secondary node. In the other case where NR is the master and LTE is the secondary node, the corresponding terms are SeNB and MgNB. The general terms MN and SN are also used for all cases of DC.

Consider now duplication in NR and EN-DC. It has been agreed to introduce duplication of packets for the sake of enhancing reliability. Duplication can be applied at either the DC level or carrier aggregation (CA) level. DC level duplication is applicable only to split bearers where the same PDCP packet is forwarded to both the MCG and SCG RLC entities that are mapped to the split bearer. On the other hand, CA level duplication is applicable only to non-split bearers (i.e. SCG bearers in the case of EN-DC, or MCG bearers in the case of NE-DC or NR-NR DC) and two RLC entities are mapped to the same PDCP entity (i.e. two SCG RLC entities mapped to a certain SCG bearer in the case of EN-DC, or two MCG RLC entities mapped to the same MCG bearer in the case of NE-DC or NR-NR DC). With CA level duplication, logical channel (carrier) restriction is made so that one RLC entity is mapped only to one of the carriers comprising the CA tuple (so that we could ensure diversity, i.e. the original and the duplicate will not be sent over the same carrier).

Figure 19A:
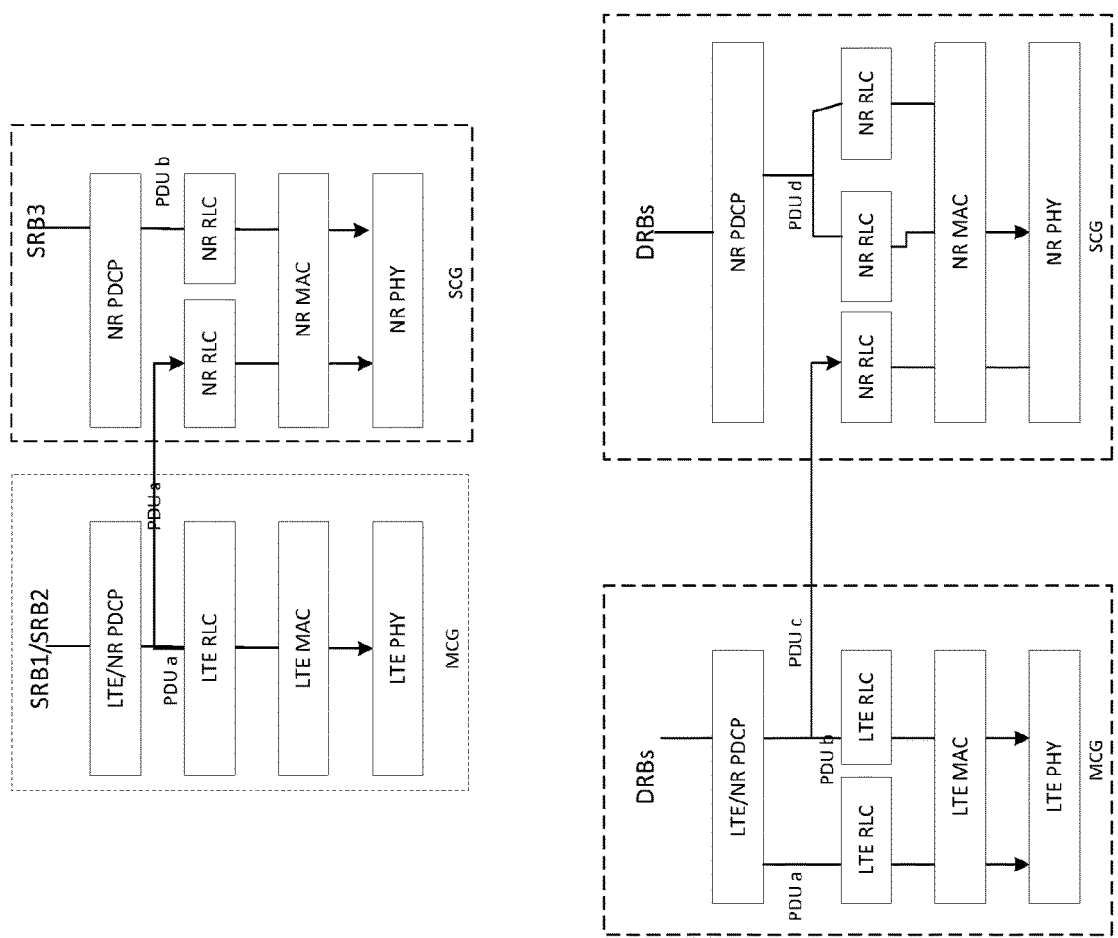
FIG. 19A is a block diagram of dual connectivity (DC) and carrier aggregation (CA) level duplication for EN-DC.
Figure 19B:
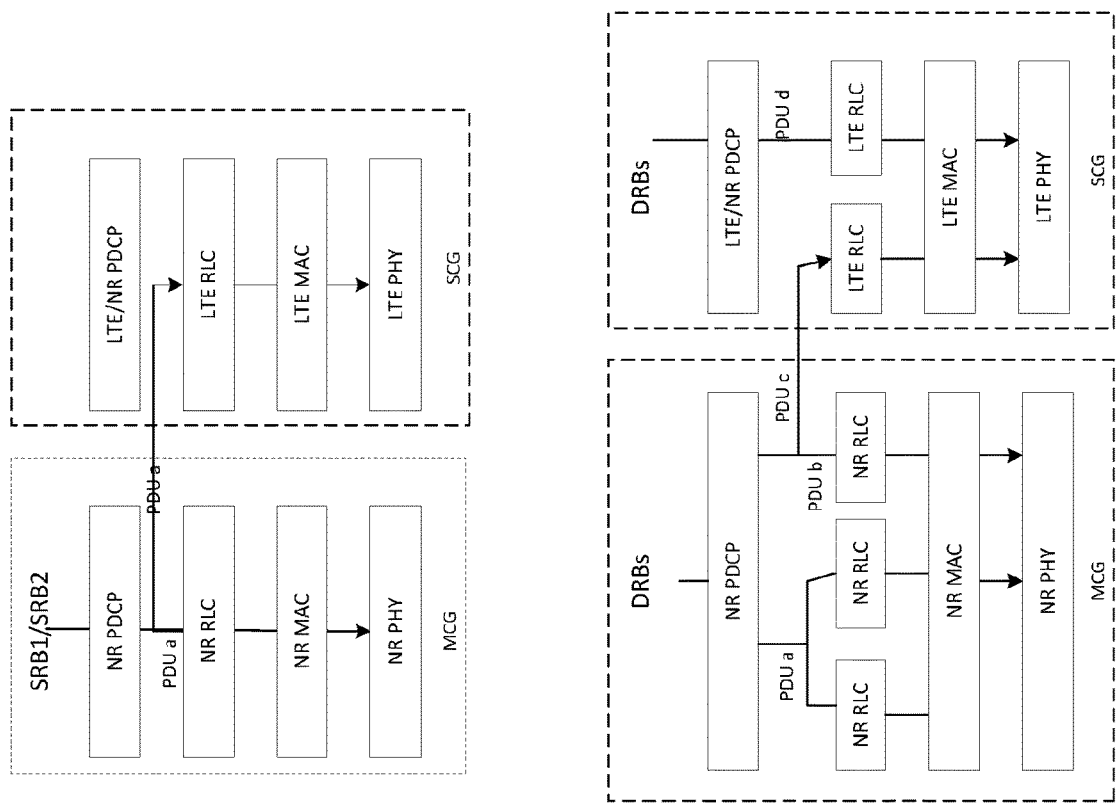
FIG. 19B is a block diagram of dual connectivity (DC) and carrier aggregation (CA) level duplication for NE-DC.
Figure 19C:
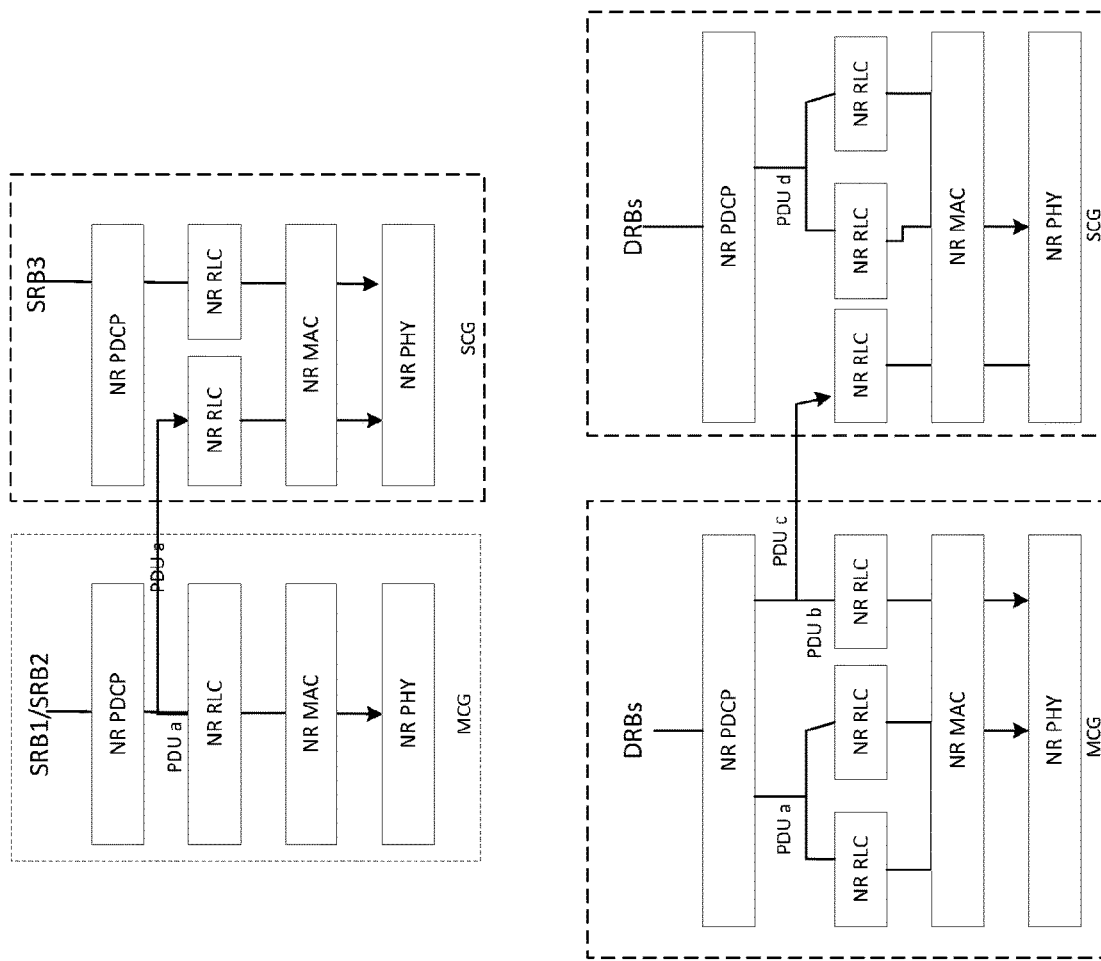
FIG. 19C is a block diagram of dual connectivity (DC) and carrier aggregation (CA) level duplication for NR-NR DC.

FIGS. 19A, 19B, and 19C summarizes DC and CA level duplication of data radio bearers (DRBs) and signaling radio bearers (SRBs) for the different MR-DC cases, where DC level duplication is supported by SRBs while DRBs support CA level duplication. In particular, FIG. 19A summarizes SRB and DRB duplication for EN-DC. FIG. 19B summarizes SRB and DRB duplication for NE-DC. And FIG. 19C summarizes SRB and DRB duplication for NR-NR DC. Only non-split bearers support CA level duplications. Note that, for the sake of brevity, SCG split bearers is not considered, but the behavior is the same as in MCG split bearers. Also, as per bearer harmonization agreements, the split RBs will use NR PDCP and the MCG RBs may be configured to use either LTE or NR PDCP, hence the term "LTE/NR PDCP" is used to signify that. The case of CA level duplication for MN terminated SCG bearers and SN terminated MCG bearers is also not shown.

There currently exist certain challenge(s). One possible approach for covering DRB and SRB duplication in carrier aggregation scenarios is the following. A gNB-DU is informed by the gNB-CU when duplication is activated, i.e. when it is possible to make use of duplication for SRB and DRB traffic. A gNB-DU signals the primary logical channel ID (LCID) to the gNB-CU. Namely, when the gNB-DU sets up the two RLC bearers needed to serve duplicate traffic towards the UE, the gNB-DU needs to select one of these RLC bearers as primary and sends the primary LCID to the gNB-CU. This is needed to allow the gNB-CU to configure the UE with an RRC Primary Path, namely a path that, out of the two paths available for duplication, is the one where traffic will always be transmitted independently of whether duplication is used or not. For DRBs, a gNB-CU decides when to duplicate PDCP protocol data units (PDUs) towards the UE. For UL the gNB-DU is in charge of signaling to the UE when UL duplication needs to be activated by means of Medium Access Control (MAC) Control Element (CE) commands (the gNB-CU could also activate duplication via RRC reconfiguration). For SRBs, a gNB-CU decides when to duplicate RRC messages towards the UE and it does so by signaling to the gNB-DU that specific RRC messages need to be duplicated so that the gNB-DU performs the duplication.

This solution does not address the scenario where duplication is achieved via two paths that are hosted by different gNB-DUs.

With this scenario there are a number of problems to be solved. First, when the two RLC bearers used to transmit duplicate traffic between RAN and UE are hosted by different gNB-DUs, challenges exists in determining which bearer should be considered as the primary path and determining which node should decide this. This is important because the gNB-CU needs to signal to the UE a configuration that allows the UE to unequivocally understand the primary path.

Second, for UL duplication, challenges exist in determining which of the gNB-DUs involved should be in charge of triggering duplication of traffic in UL. It should be noted that there is no direct coordination/interface between gNB-DUs, hence it is not heretofore possible to understand at one gNB-DU side the radio conditions at the other gNB-DU (for UL). With that, and if a decision on which gNB-DU decides on UL duplication execution is not taken, there is the risk that gNB-DUs trigger UL duplication when it is not needed, e.g. because radio quality is good and not in need of duplication on the other gNB-DU.

Certain aspects of the present disclosure and their embodiments may provide solutions to these or other challenges. Some embodiments provide a mechanism to enable the control of the activation/deactivation of duplication of DL and UL data, when the duplication is to be performed towards (in UL) and from (in DL) two different network nodes.

Certain embodiments may provide one or more of the following technical advantage(s). Some embodiments enable configuration of a system where DRB and SRB duplication is carried out by means of RLC bearers hosted over different logical nodes, e.g. hosted by different gNB-DUs.

In some embodiments, the gNB-CU is aware of the configuration for DRB or SRB duplication where duplicate traffic is sent over RLC bearers hosted by different gNB-DUs. Upon configuration of each gNB-DU for the purpose of serving traffic to the same UE, the gNB-CU will receive from gNB-DUs the Logical Channel ID (LCID) of RLC Bearers hosted at each gNB-DU for the UE in question. These LCIDs will include those for RLC bearers that will carry duplicate traffic, i.e. each DU will signal to the gNB-CU the LCID that will identify an RLC bearer on which split or duplicated traffic will be exchanged with the UE.

The gNB-CU decides which of the DUs (and as a consequence, which LCID) will be the primary path for the UL traffic. The gNB-CU may do this by means of knowledge of radio quality information such as UL radio quality information received from the gNB-DUs, or by means of radio quality information deduced from DL Reference Signal Received Power (RSRP) measurements received from the UE over the RRC protocol. The gNB communicates the primary path to the UE in the PDCP configuration of the concerned bearer that is included in RRC reconfiguration message.

In some embodiments, the primary UL path is the same for all radio bearers. In other embodiments, by contrast, the primary UL path can be different for different radio bearers.

In some embodiments, the gNB-CU signals to the gNB-DU the result of the choice of which gNB-DU hosts the primary RLC bearer.

In some embodiments, the gNB-DU selected as the primary path (for one or multiple bearers) will be the one that will be responsible for sending the MAC CE to activate UL duplication (for those bearer(s)). The gNB-DU decides to activate duplication considering several aspects such as UL radio quality measurements performed at the DU (e.g. when the UL radio quality degrades below a certain threshold). In some embodiments, the gNB-DU that is selected as serving the primary path is also responsible for triggering a "path switch" (e.g., change the primary path). The gNB-DU can trigger a change in the primary path for example when the UL radio link degrades below a given threshold.

Alternatively or additionally, the gNB-DU selected as the primary path (for one or multiple bearers) may be the one that will be responsible for sending the MAC CE to deactivate UL duplication (for those bearer(s)). The gNB-DU decides to deactivate duplication considering several aspects such as UL radio quality measurements performed at the gNB-DU (e.g. when the UL radio quality becomes better than a certain threshold).

In some embodiments, though, once duplication is active, the gNB-DU not selected as serving the primary path (for one or multiple bearers) is also able to send the MAC CE to deactivate UL duplication (for those bearer(s)). The gNB-DU decides to deactivate duplication considering several aspects such as UL radio quality measurements performed at the gNB-DU (e.g. when the UL radio quality becomes worse than a certain threshold, it won't be that useful to use this radio).

In some embodiments, the gNB-CU signals to one of the two or more gNB-DUs involved in the duplication configuration whether the gNB-DU is in charge of triggering/activating UL duplication. Namely, the gNB-CU selects the gNB-DU that is able to trigger MAC CE commands towards the UE triggering the UE to duplicate UL data. This decision may be taken by the gNB-CU on the basis of knowledge of the UL radio quality from the UE towards the two DUs and it can be for one or more or all the bearers configured with PDCP duplication for a given UE.

In some embodiments, the gNB-CU informs the gNB-DU in charge of duplication for one or multiple bearers (i.e. a gNB-DU sending the MAC CEs to the UE) about the duplication activation/deactivation status of all "bearers for which duplication is configured which have RLC bearers in this gNB-DU (for the UE)". This may be necessary in embodiments where the MAC CE contains a bitmap of exactly this subset of DRBs. Accordingly, in some embodiments, the gNB-CU sends to each gNB-DU that is in charge of UL duplication for at least one bearer, information about the duplication status of all the DRBs for the UE (or only the bearers for which the there is an RLC bearer in this gNB-DU).

To support these embodiments, the gNB-DUs in charge of duplication control for at least one DRB configured with duplication for the UE may inform the gNB-CU whenever duplication status (activated/deactivated) is changed (changed by the gNB-DU). This way, the gNB-CU is always updated upon duplication status of the DRBs and can then trigger/relay the duplication activation status to the other gNB-DUs as described above. In yet another variant, the duplication status is directly communicated between the gNB-DUs, i.e., when duplication status is changed, the other gNB-DU is informed.

In another embodiment, the gNB-CU declares the duplication status activated for a DRB (and then informs the gNB-DUs about it as described above) when the PDCP receiver of the gNB-CU registers duplicate receptions, i.e. after e.g. a certain number of triggered duplicate discards in the PDCP receiver. The deactivation of duplication can be identified by observing no duplicate-discards for a certain time, or a certain number of PDCP packets received.

In some embodiments, the gNB-CU may decide to change the gNB-DU in charge of triggering UL duplication for one or multiple bearers. For this reason, the gNB-CU may signal to the previously selected gNB-DU that it is no longer in charge of triggering MAC CE commands towards the UE for triggering UL duplication. Secondly, the gNB-CU may signal to the newly selected gNB-DU that it has from now on been elected as the node in charge of triggering UL duplication.

In some embodiments, the gNB-DU may decide to change the primary path for a split bearer. This decision may be taken based on the updated information on the UL radio quality conditions at each DU serving the UE. The gNB-CU may also signal such change of primary path to each gNB-DU involved; namely, gNB-CU may signal to the previously elected gNB-DU hosting the primary path that it no longer hosts such primary path and it may signal to a new gNB-DU that from now on it hosts the primary path for the UE.

In a different embodiment, the decision of activating/deactivating UL duplication for duplication with different gNB-DUs is taken by the node hosting PDCP (e.g., gNB-CU-UP). The gNB-CU-UP can take the decision to activate/deactivate duplication based on assistance information from the gNB-DUs serving the UE (e.g., UL radio quality information). To support this embodiment, signalling is introduced (e.g., over the F1-U or F1-C interface) to allow the node hosting PDCP to request the gNB-DU(s) to generate a MAC CE toward the UE when the decisions to activate/deactivate UL duplication is taken. The embodiment can be realized for example as follows.

The gNB-CU-CP decides to configure PDCP duplication for a given DRB (DRB1). The gNB-CU-CP sends E1 Bearer Context Setup request message to the gNB-CU-UP with indication that DRB1 uses PDCP duplication. The gNB-CU-CP may include a new information element (IE) ("UL Duplication IE") to indicate that the gNB-CU-UP is in charge of activating/deactivating UL duplication. Note in this regard that the gNB-CU-UP is always in charge of activating DL duplication. In case of intra-DU duplication (with CA) the gNB-DU can be in charge of activating/deactivating UL duplication. The "UL Duplication IE" will be used mostly for the case of intra-DU or inter-node duplication. In any event, the gNB-CU-CP sends F1 UE Context Setup Request to the two (or more) gNB-DUs that are going to serve a radio leg of DRB1. The gNB-CU-CP may include a new IE ("Duplication Configured IE") to inform all the gNB-DUs in question that there is one (or more) other gNB-DUs that are configured to provide duplication for DRB1. The "Duplication Configured IE" may also be used to indicate to the gNB-DU whether it is going to serve the primary path or not. Note in this regard that including the "Duplication Configured IE" may be useful for setting inactivity timers at the gNB-DU e.g., a gNB-DU that is not configured as the primary will not trigger inactivity notification even if data is not received for long time.

The gNB-DUs may report UL radio quality information to the node hosting PDCP (gNB-CU-UP). The reporting can be periodic or based on polling from gNB-CU-UP or event-triggered.

Based on the radio link quality, the gNB-CU-UP can request to the gNB-DU serving the primary path (or another gNB-DU serving DRB1) to send a MAC CE to the UE to activate UL duplication. This can be done for example by using a new NR-U (NR User Plane protocol) PDU or adding new IE in the NR-U DL Data PDU.

A similar approach can also be used for de-activating UL duplication when is not needed anymore: i.e., the gNB-CU-UP sends an indication over NR-U to the gNB-DU that triggers a MAC CE toward the UE.

There are several ways to switch the primary UL path, in case the gNB-CU-UP decides to do so. As one alternative, the gNB-CU-UP could inform the gNB-CU-CP over E1. The gNB-CU-CP then performs the switch by opportune F1 and RRC signalling toward the gNB-DUs and the UE respectively. Another alternative is for the gNB-CU-UP to inform the gNB-DU that is chosen to be the primary UL, and this gNB-DU sends a MAC CE to deactivate the duplication. The UE can implicitly infer that the MAC CE where the duplication deactivation is received from to be the new primary UL. Yet another alternative is to make it possible for the MAC CE to deactivate the duplication be sent from either DU, but also contain an explicit information regarding the new primary path.

Note that, in this application, the example of a system made of a gNB-CU and gNB-DUs is taken. However, the methods herein apply to any system in which DRB and SRB duplication can be performed over RLC bearers that are not supported by one and the same node.

Also note that in the example system used herein the UE is served by two gNB-DUs. However, the methods herein apply also to scenarios where the UE is served by more than two gNB-DUs at the same time.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060b, and WDs 2010, 2010b, and 2010c. In practice, a wireless network may further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2060 are depicted as single boxes located within a larger box, or nested within multiple boxes, in practice, a network node may comprise multiple different physical components that make up a single illustrated component (e.g., device readable medium 2080 may comprise multiple separate hard drives as well as multiple RAM modules).

Similarly, network node 2060 may be composed of multiple physically separate components (e.g., a NodeB component and a RNC component, or a BTS component and a BSC component, etc.), which may each have their own respective components.

In certain scenarios in which network node 2060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2060 may be configured to support multiple radio access technologies (RATs). In such embodiments, some components may be duplicated (e.g., separate device readable medium 2080 for the different RATs) and some components may be reused (e.g., the same antenna 2062 may be shared by the RATs). Network node 2060 may also include multiple sets of the various illustrated components for different wireless technologies integrated into network node 2060, such as, for example, GSM, WCDMA, LTE, NR, WiFi, or Bluetooth wireless technologies. These wireless technologies may be integrated into the same or different chip or set of chips and other components within network node 2060.

Processing circuitry 2070 is configured to perform any determining, calculating, or similar operations (e.g., certain obtaining operations) described herein as being provided by a network node. These operations performed by processing circuitry 2070 may include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. For example, processing circuitry 2070 may execute instructions stored in device readable medium 2080 or in memory within processing circuitry 2070. Such functionality may include providing any of the various wireless features, functions, or benefits discussed herein. In some embodiments, processing circuitry 2070 may include a system on a chip (SOC).

In some embodiments, processing circuitry 2070 may include one or more of radio frequency (RF) transceiver circuitry 2072 and baseband processing circuitry 2074. In some embodiments, radio frequency (RF) transceiver circuitry 2072 and baseband processing circuitry 2074 may be on separate chips (or sets of chips), boards, or units, such as radio units and digital units. In alternative embodiments, part or all of RF transceiver circuitry 2072 and baseband processing circuitry 2074 may be on the same chip or set of chips, boards, or units In certain embodiments, some or all of the functionality described herein as being provided by a network node, base station, eNB or other such network device may be performed by processing circuitry 2070 executing instructions stored on device readable medium 2080 or memory within processing circuitry 2070. In alternative embodiments, some or all of the functionality may be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2070. Device readable medium 2080 may store any suitable instructions, data or information, including a computer program, software, an application including one or more of logic, rules, code, tables, etc. and/or other instructions capable of being executed by processing circuitry 2070 and, utilized by network node 2060. Device readable medium 2080 may be used to store any calculations made by processing circuitry 2070 and/or any data received via interface 2090. In some embodiments, processing circuitry 2070 and device readable medium 2080 may be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that may be coupled to, or in certain embodiments a part of, antenna 2062. Radio front end circuitry 2092 comprises filters 2098 and amplifiers 2096. Radio front end circuitry 2092 may be connected to antenna 2062 and processing circuitry 2070. Radio front end circuitry may be configured to condition signals communicated between antenna 2062 and processing circuitry 2070. Radio front end circuitry 2092 may receive digital data that is to be sent out to other network nodes or WDs via a wireless connection. Radio front end circuitry 2092 may convert the digital data into a radio signal having the appropriate channel and bandwidth parameters using a combination of filters 2098 and/or amplifiers 2096. The radio signal may then be transmitted via antenna 2062. Similarly, when receiving data, antenna 2062 may collect radio signals which are then converted into digital data by radio front end circuitry 2092. The digital data may be passed to processing circuitry 2070. In other embodiments, the interface may comprise different components and/or different combinations of components.

In certain alternative embodiments, network node 2060 may not include separate radio front end circuitry 2092, instead, processing circuitry 2070 may comprise radio front end circuitry and may be connected to antenna 2062 without separate radio front end circuitry 2092. Similarly, in some embodiments, all or some of RF transceiver circuitry 2072 may be considered a part of interface 2090. In still other embodiments, interface 2090 may include one or more ports or terminals 2094, radio front end circuitry 2092, and RF transceiver circuitry 2072, as part of a radio unit (not shown), and interface 2090 may communicate with baseband processing circuitry 2074, which is part of a digital unit (not shown).

Antenna 2062 may include one or more antennas, or antenna arrays, configured to send and/or receive wireless signals. Antenna 2062 may be coupled to radio front end circuitry 2090 and may be any type of antenna capable of transmitting and receiving data and/or signals wirelessly. In some embodiments, antenna 2062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2062 may be separate from network node 2060 and may be connectable to network node 2060 through an interface or port.

Antenna 2062, interface 2090, and/or processing circuitry 2070 may be configured to perform any receiving operations and/or certain obtaining operations described herein as being performed by a network node. Any information, data and/or signals may be received from a wireless device, another network node and/or any other network equipment. Similarly, antenna 2062, interface 2090, and/or processing circuitry 2070 may be configured to perform any transmitting operations described herein as being performed by a network node. Any information, data and/or signals may be transmitted to a wireless device, another network node and/or any other network equipment.

Power circuitry 2087 may comprise, or be coupled to, power management circuitry and is configured to supply the components of network node 2060 with power for performing the functionality described herein. Power circuitry 2087 may receive power from power source 2086. Power source 2086 and/or power circuitry 2087 may be configured to provide power to the various components of network node 2060 in a form suitable for the respective components (e.g., at a voltage and current level needed for each respective component). Power source 2086 may either be included in, or external to, power circuitry 2087 and/or network node 2060. For example, network node 2060 may be connectable to an external power source (e.g., an electricity outlet) via an input circuitry or interface such as an electrical cable, whereby the external power source supplies power to power circuitry 2087. As a further example, power source 2086 may comprise a source of power in the form of a battery or battery pack which is connected to, or integrated in, power circuitry 2087. The battery may provide backup power should the external power source fail. Other types of power sources, such as photovoltaic devices, may also be used.

Alternative embodiments of network node 2060 may include additional components beyond those shown in FIG. 20 that may be responsible for providing certain aspects of the network node's functionality, including any of the functionality described herein and/or any functionality necessary to support the subject matter described herein. For example, network node 2060 may include user interface equipment to allow input of information into network node 2060 and to allow output of information from network node 2060. This may allow a user to perform diagnostic, maintenance, repair, and other administrative functions for network node 2060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 may include multiple sets of one or more of the illustrated components for different wireless technologies supported by WD 2010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2010.

Antenna 2011 may include one or more antennas or antenna arrays, configured to send and/or receive wireless signals, and is connected to interface 2014. In certain alternative embodiments, antenna 2011 may be separate from WD 2010 and be connectable to WD 2010 through an interface or port. Antenna 2011, interface 2014, and/or processing circuitry 2020 may be configured to perform any receiving or transmitting operations described herein as being performed by a WD. Any information, data and/or signals may be received from a network node and/or another WD. In some embodiments, radio front end circuitry and/or antenna 2011 may be considered an interface.

As illustrated, interface 2014 comprises radio front end circuitry 2012 and antenna 2011. Radio front end circuitry 2012 comprise one or more filters 2018 and amplifiers 2016. Radio front end circuitry 2014 is connected to antenna 2011 and processing circuitry 2020, and is configured to condition signals communicated between antenna 2011 and processing circuitry 2020. Radio front end circuitry 2012 may be coupled to or a part of antenna 2011. In some embodiments, WD 2010 may not include separate radio front end circuitry 2012; rather, processing circuitry 2020 may comprise radio front end circuitry and may be connected to antenna 2011. Similarly, in some embodiments, some or all of RF transceiver circuitry 2022 may be considered a part of interface 2014. Radio front end circuitry 2012 may receive digital data that is to be sent out to other network nodes or WDs via a wireless connection. Radio front end circuitry 2012 may convert the digital data into a radio signal having the appropriate channel and bandwidth parameters using a combination of filters 2018 and/or amplifiers 2016. The radio signal may then be transmitted via antenna 2011. Similarly, when receiving data, antenna 2011 may collect radio signals which are then converted into digital data by radio front end circuitry 2012. The digital data may be passed to processing circuitry 2020. In other embodiments, the interface may comprise different components and/or different combinations of components.

Processing circuitry 2020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality may include providing any of the various wireless features or benefits discussed herein. For example, processing circuitry 2020 may execute instructions stored in device readable medium 2030 or in memory within processing circuitry 2020 to provide the functionality disclosed herein.

As illustrated, processing circuitry 2020 includes one or more of RF transceiver circuitry 2022, baseband processing circuitry 2024, and application processing circuitry 2026. In other embodiments, the processing circuitry may comprise different components and/or different combinations of components. In certain embodiments processing circuitry 2020 of WD 2010 may comprise a SOC. In some embodiments, RF transceiver circuitry 2022, baseband processing circuitry 2024, and application processing circuitry 2026 may be on separate chips or sets of chips. In alternative embodiments, part or all of baseband processing circuitry 2024 and application processing circuitry 2026 may be combined into one chip or set of chips, and RF transceiver circuitry 2022 may be on a separate chip or set of chips. In still alternative embodiments, part or all of RF transceiver circuitry 2022 and baseband processing circuitry 2024 may be on the same chip or set of chips, and application processing circuitry 2026 may be on a separate chip or set of chips. In yet other alternative embodiments, part or all of RF transceiver circuitry 2022, baseband processing circuitry 2024, and application processing circuitry 2026 may be combined in the same chip or set of chips. In some embodiments, RF transceiver circuitry 2022 may be a part of interface 2014. RF transceiver circuitry 2022 may condition RF signals for processing circuitry 2020.

In certain embodiments, some or all of the functionality described herein as being performed by a WD may be provided by processing circuitry 2020 executing instructions stored on device readable medium 2030, which in certain embodiments may be a computer-readable storage medium. In alternative embodiments, some or all of the functionality may be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 may be configured to perform any determining, calculating, or similar operations (e.g., certain obtaining operations) described herein as being performed by a WD. These operations, as performed by processing circuitry 2020, may include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 may be operable to store a computer program, software, an application including one or more of logic, rules, code, tables, etc. and/or other instructions capable of being executed by processing circuitry 2020. Device readable medium 2030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2020. In some embodiments, processing circuitry 2020 and device readable medium 2030 may be considered to be integrated.

User interface equipment 2032 may provide components that allow for a human user to interact with WD 2010. Such interaction may be of many forms, such as visual, audial, tactile, etc. User interface equipment 2032 may be operable to produce output to the user and to allow the user to provide input to WD 2010. The type of interaction may vary depending on the type of user interface equipment 2032 installed in WD 2010. For example, if WD 2010 is a smart phone, the interaction may be via a touch screen; if WD 2010 is a smart meter, the interaction may be through a screen that provides usage (e.g., the number of gallons used) or a speaker that provides an audible alert (e.g., if smoke is detected). User interface equipment 2032 may include input interfaces, devices and circuits, and output interfaces, devices and circuits. User interface equipment 2032 is configured to allow input of information into WD 2010, and is connected to processing circuitry 2020 to allow processing circuitry 2020 to process the input information. User interface equipment 2032 may include, for example, a microphone, a proximity or other sensor, keys/buttons, a touch display, one or more cameras, a USB port, or other input circuitry. User interface equipment 2032 is also configured to allow output of information from WD 2010, and to allow processing circuitry 2020 to output information from WD 2010. User interface equipment 2032 may include, for example, a speaker, a display, vibrating circuitry, a USB port, a headphone interface, or other output circuitry. Using one or more input and output interfaces, devices, and circuits, of user interface equipment 2032, WD 2010 may communicate with end users and/or the wireless network, and allow them to benefit from the functionality described herein.

Auxiliary equipment 2034 is operable to provide more specific functionality which may not be generally performed by WDs. This may comprise specialized sensors for doing measurements for various purposes, interfaces for additional types of communication such as wired communications etc. The inclusion and type of components of auxiliary equipment 2034 may vary depending on the embodiment and/or scenario.

Power source 2036 may, in some embodiments, be in the form of a battery or battery pack. Other types of power sources, such as an external power source (e.g., an electricity outlet), photovoltaic devices or power cells, may also be used. WD 2010 may further comprise power circuitry 2037 for delivering power from power source 2036 to the various parts of WD 2010 which need power from power source 2036 to carry out any functionality described or indicated herein. Power circuitry 2037 may in certain embodiments comprise power management circuitry. Power circuitry 2037 may additionally or alternatively be operable to receive power from an external power source; in which case WD 2010 may be connectable to the external power source (such as an electricity outlet) via input circuitry or an interface such as an electrical power cable. Power circuitry 2037 may also in certain embodiments be operable to deliver power from an external power source to power source 2036. This may be, for example, for the charging of power source 2036. Power circuitry 2037 may perform any formatting, converting, or other modification to the power from power source 2036 to make the power suitable for the respective components of WD 2010 to which power is supplied.

Figure 21:
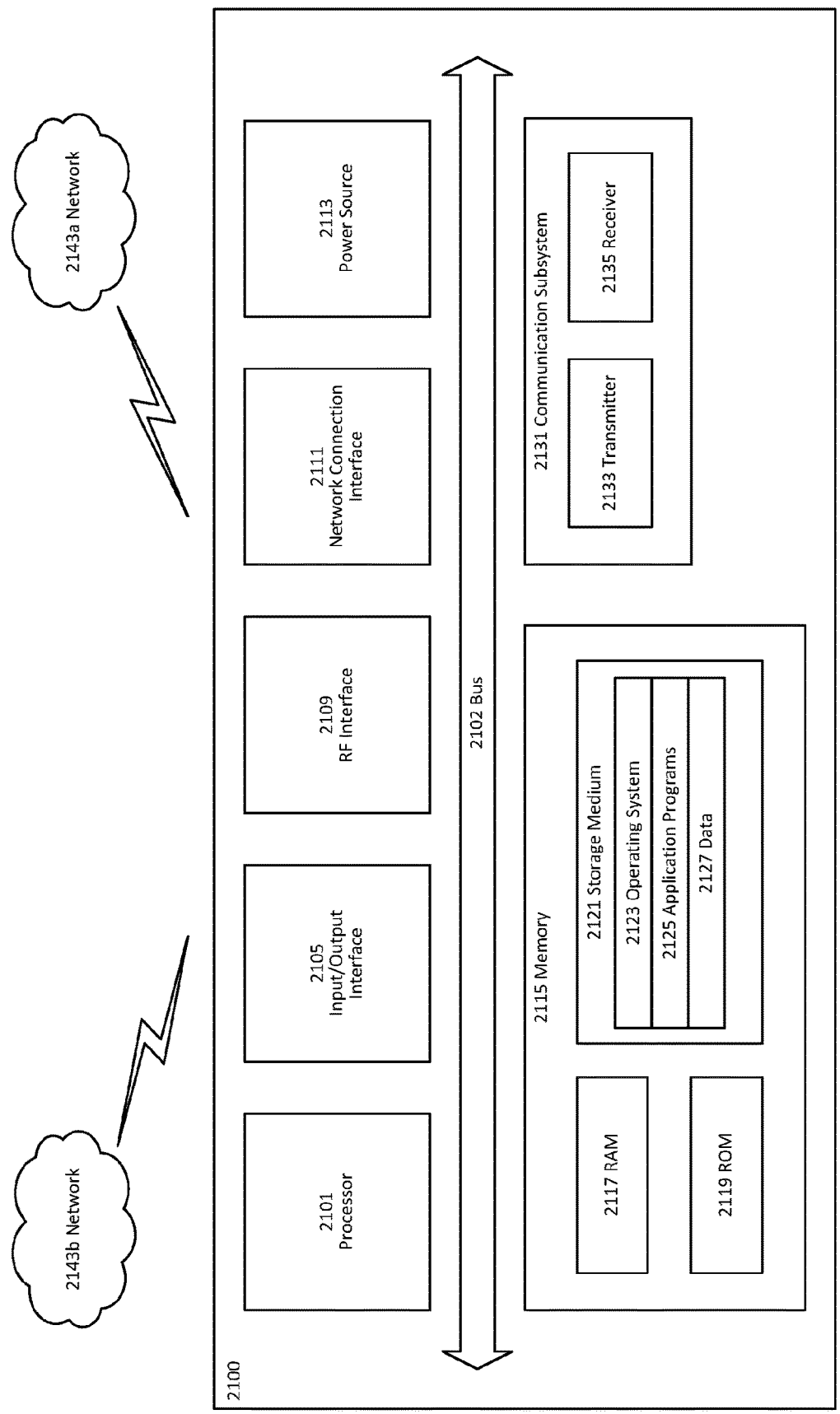
FIG. 21 is a block diagram of a user equipment according to some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 21200 may be any UE identified by the $3^{rd}$ Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2133, and/or any other component, or any combination thereof. Storage medium 2121 includes operating system 2123, application program 2125, and data 2127. In other embodiments, storage medium 2121 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 2101 may be configured to process computer instructions and data. Processing circuitry 2101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 may include two central processing units (CPUs). Data may be information in a form suitable for use by a computer.

In the depicted embodiment, input/output interface 2105 may be configured to provide a communication interface to an input device, output device, or input and output device. UE 2100 may be configured to use an output device via input/output interface 2105. An output device may use the same type of interface port as an input device. For example, a USB port may be used to provide input to and output from UE 2100. The output device may be a speaker, a sound card, a video card, a display, a monitor, a printer, an actuator, an emitter, a smartcard, another output device, or any combination thereof. UE 2100 may be configured to use an input device via input/output interface 2105 to allow a user to capture information into UE 2100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 2109 may be configured to provide a communication interface to RF components such as a transmitter, a receiver, and an antenna. Network connection interface 2111 may be configured to provide a communication interface to network 2143$a$. Network 2143$a$ may encompass wired and/or wireless networks such as a local-area network (LAN), a wide-area network (WAN), a computer network, a wireless network, a telecommunications network, another like network or any combination thereof. For example, network 2143$a$ may comprise a Wi-Fi network. Network connection interface 2111 may be configured to include a receiver and a transmitter interface used to communicate with one or more other devices over a communication network according to one or more communication protocols, such as Ethernet, TCP/IP. SONET, ATM, or the like. Network connection interface 2111 may implement receiver and transmitter functionality appropriate to the communication network links (e.g., optical, electrical, and the like). The transmitter and receiver functions may share circuit components, software or firmware, or alternatively may be implemented separately.

RAM 2117 may be configured to interface via bus 2102 to processing circuitry 2101 to provide storage or caching of data or computer instructions during the execution of software programs such as the operating system, application programs, and device drivers. ROM 2119 may be configured to provide computer instructions or data to processing circuitry 2101. For example, ROM 2119 may be configured to store invariant low-level system code or data for basic system functions such as basic input and output (I/O), startup, or reception of keystrokes from a keyboard that are stored in a non-volatile memory. Storage medium 2121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2121 may be configured to include operating system 2123, application program 2125 such as a web browser application, a widget or gadget engine or another application, and data file 2127. Storage medium 2121 may store, for use by UE 2100, any of a variety of various operating systems or combinations of operating systems.

Storage medium 2121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 may allow UE 2100 to access computer-executable instructions, application programs or the like, stored on transitory or non-transitory memory media, to off-load data, or to upload data. An article of manufacture, such as one utilizing a communication system may be tangibly embodied in storage medium 2121, which may comprise a device readable medium.

In FIG. 21, processing circuitry 2101 may be configured to communicate with network 2143b using communication subsystem 2131. Network 2143a and network 2143b may be the same network or networks or different network or networks. Communication subsystem 2131 may be configured to include one or more transceivers used to communicate with network 2143b. For example, communication subsystem 2131 may be configured to include one or more transceivers used to communicate with one or more remote transceivers of another device capable of wireless communication such as another WD, UE, or base station of a radio access network (RAN) according to one or more communication protocols, such as IEEE 802.21, CDMA, WCDMA, GSM, LTE, UTRAN, WiMax, or the like. Each transceiver may include transmitter 2133 and/or receiver 2135 to implement transmitter or receiver functionality, respectively, appropriate to the RAN links (e.g., frequency allocations and the like). Further, transmitter 2133 and receiver 2135 of each transceiver may share circuit components, software or firmware, or alternatively may be implemented separately.

In the illustrated embodiment, the communication functions of communication subsystem 2131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 may include cellular communication, Wi-Fi communication, Bluetooth communication, and GPS communication. Network 2143b may encompass wired and/or wireless networks such as a local-area network (LAN), a wide-area network (WAN), a computer network, a wireless network, a telecommunications network, another like network or any combination thereof. For example, network 2143b may be a cellular network, a Wi-Fi network, and/or a near-field network. Power source 2113 may be configured to provide alternating current (AC) or direct current (DC) power to components of UE 2100.

The features, benefits and/or functions described herein may be implemented in one of the components of UE 2100 or partitioned across multiple components of UE 2100. Further, the features, benefits, and/or functions described herein may be implemented in any combination of hardware, software or firmware. In one example, communication subsystem 2131 may be configured to include any of the components described herein. Further, processing circuitry 2101 may be configured to communicate with any of such components over bus 2102. In another example, any of such components may be represented by program instructions stored in memory that when executed by processing circuitry 2101 perform the corresponding functions described herein. In another example, the functionality of any of such components may be partitioned between processing circuitry 2101 and communication subsystem 2131. In another example, the non-computationally intensive functions of any of such components may be implemented in software or firmware and the computationally intensive functions may be implemented in hardware.

Figure 22:
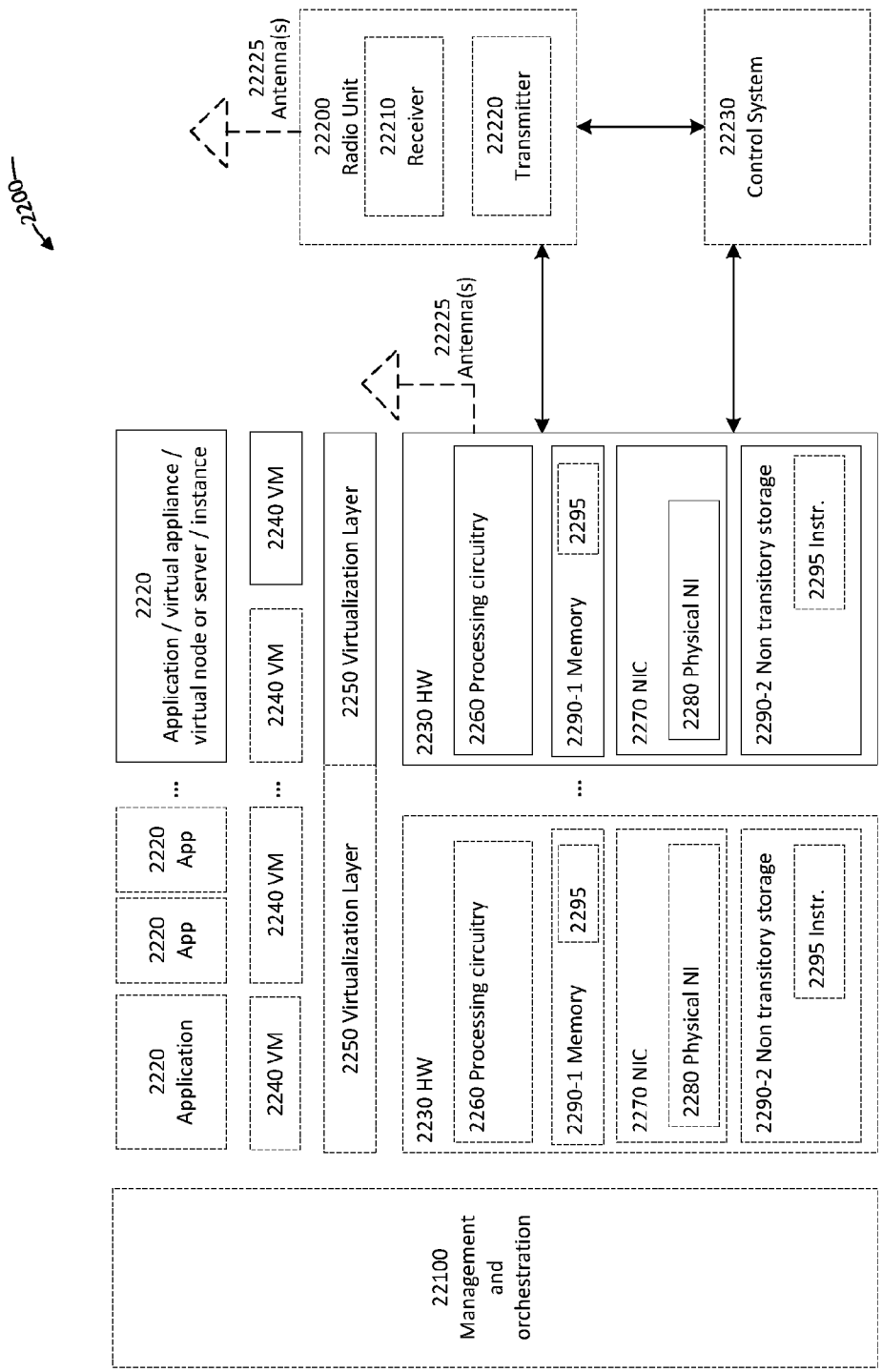
FIG. 22 is a block diagram of a virtualization environment according to some embodiments.

FIG. 22 is a schematic block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node may be entirely virtualized.

The functions may be implemented by one or more applications 2220 (which may alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200, comprises general-purpose or special-purpose network hardware devices 2230 comprising a set of one or more processors or processing circuitry 2260, which may be commercial off-the-shelf (COTS) processors, dedicated Application Specific Integrated Circuits (ASICs), or any other type of processing circuitry including digital or analog hardware components or special purpose processors. Each hardware device may comprise memory 2290-1 which may be non-persistent memory for temporarily storing instructions 2295 or software executed by processing circuitry 2260. Each hardware device may comprise one or more network interface controllers (NICs) 2270, also known as network interface cards, which include physical network interface 2280. Each hardware device may also include non-transitory, persistent, machine-readable storage media 2290-2 having stored therein software 2295 and/or instructions executable by processing circuitry 2260. Software 2295 may include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240, comprise virtual processing, virtual memory, virtual networking or interface and virtual storage, and may be run by a corresponding virtualization layer 2250 or hypervisor. Different embodiments of the instance of virtual appliance 2220 may be implemented on one or more of virtual machines 2240, and the implementations may be made in different ways.

During operation, processing circuitry 2260 executes software 2295 to instantiate the hypervisor or virtualization layer 2250, which may sometimes be referred to as a virtual machine monitor (VMM). Virtualization layer 2250 may present a virtual operating platform that appears like networking hardware to virtual machine 2240.

As shown in FIG. 22, hardware 2230 may be a standalone network node with generic or specific components. Hardware 2230 may comprise antenna 22225 and may implement some functions via virtualization. Alternatively, hardware 2230 may be part of a larger cluster of hardware (e.g. such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2240 may be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 may be coupled to one or more antennas 22225. Radio units 22200 may communicate directly with hardware nodes 2230 via one or more appropriate network interfaces and may be used in combination with the virtual components to provide a virtual node with radio capabilities, such as a radio access node or a base station.

In some embodiments, some signalling can be effected with the use of control system 22230 which may alternatively be used for communication between the hardware nodes 2230 and radio units 22200.

Figure 23:
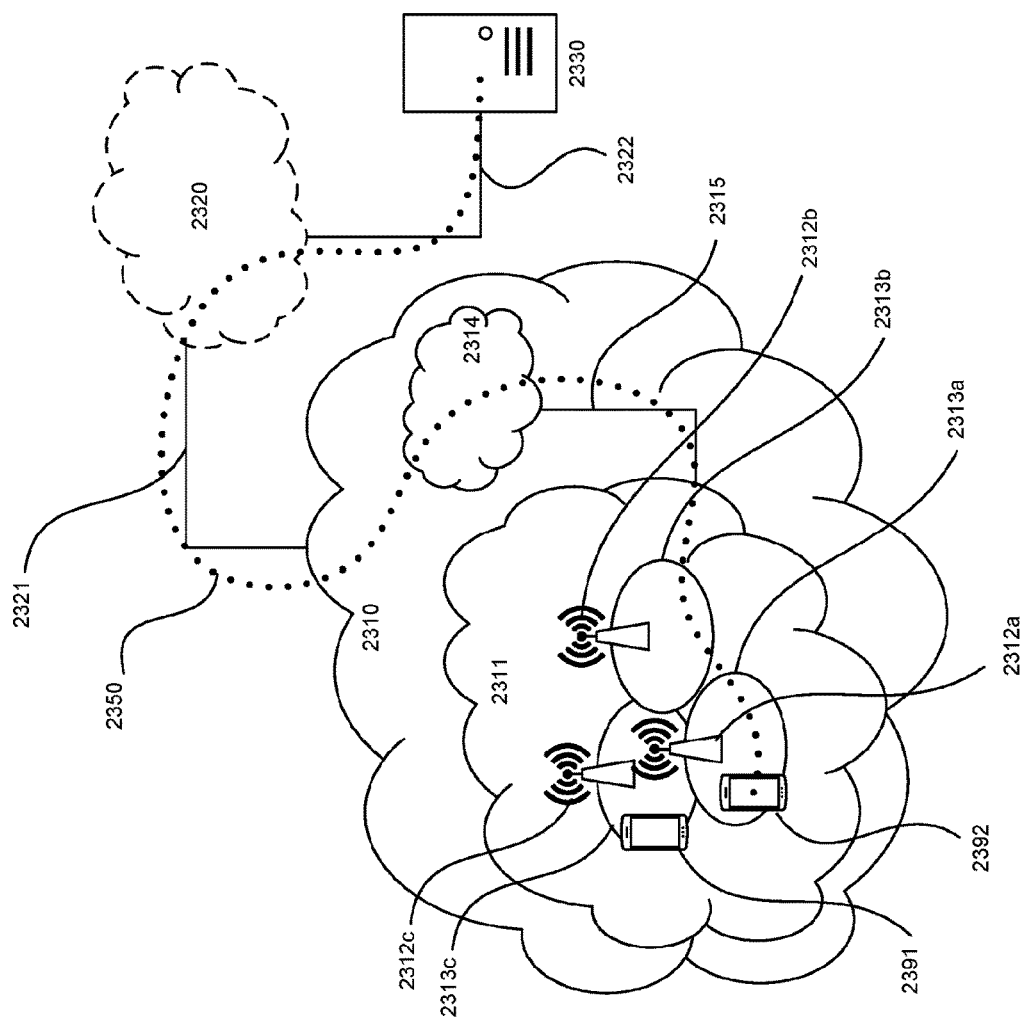
FIG. 23 is a block diagram of a communication network with a host computer according to some embodiments.

FIG. 23 illustrates a telecommunication network connected via an intermediate network to a host computer in accordance with some embodiments. In particular, with reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. A first UE 2391 located in coverage area 2313c is configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the corresponding base station 2312.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
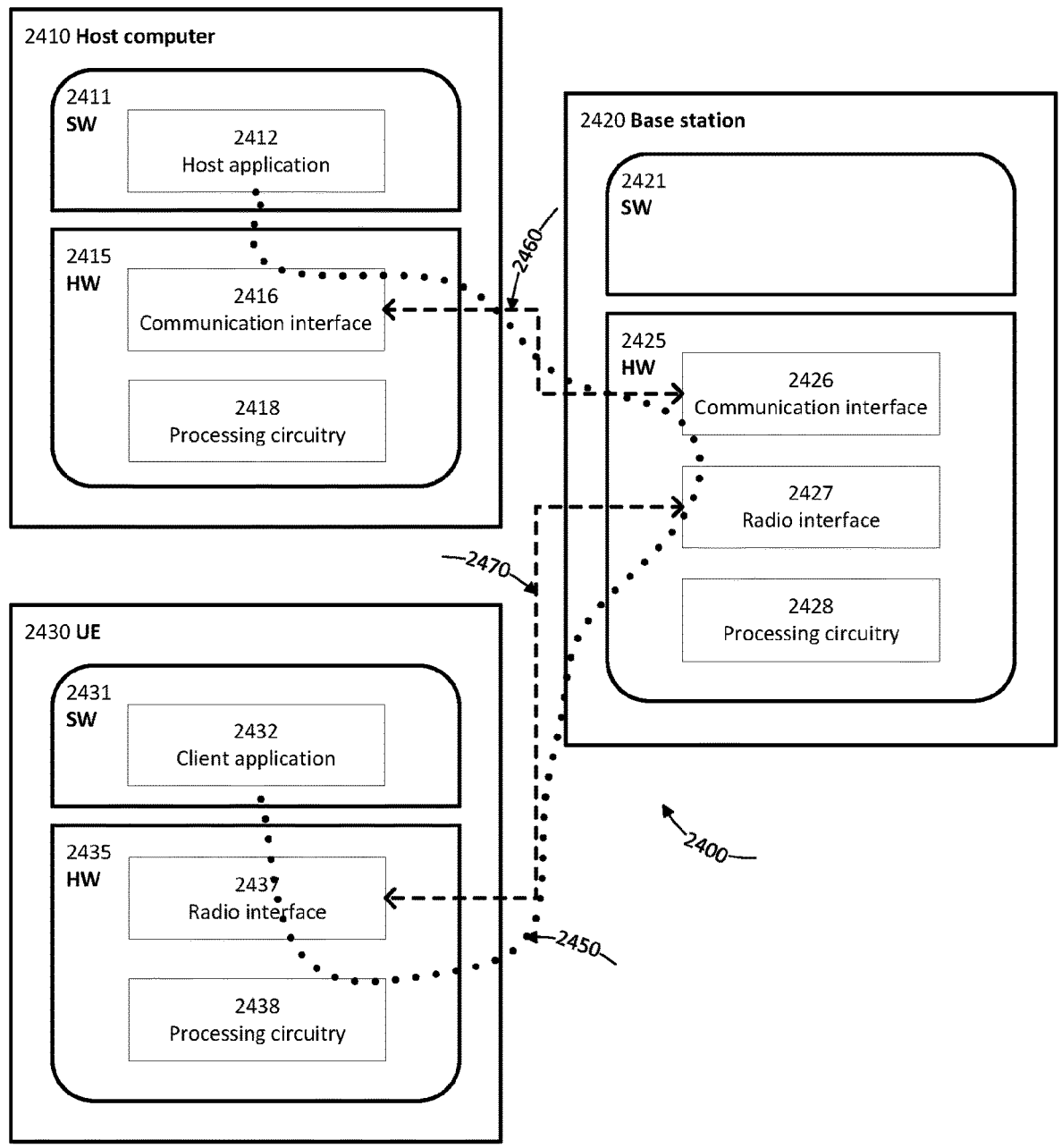
FIG. 24 is a block diagram of a host computer according to some embodiments.

Example implementations, in accordance with an embodiment, of the UE, base station and host computer discussed in the preceding paragraphs will now be described with reference to FIG. 24. FIG. 24 illustrates host computer communicating via a base station with a user equipment over a partially wireless connection in accordance with some embodiments In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312a, 2312b, 2312c and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments may improve the data rate, transmission robustness to channel conditions, and power consumption and thereby provide benefits such as reduced user waiting time, relaxed restriction on file size, better responsiveness and/or extended battery lifetime.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figure 25:
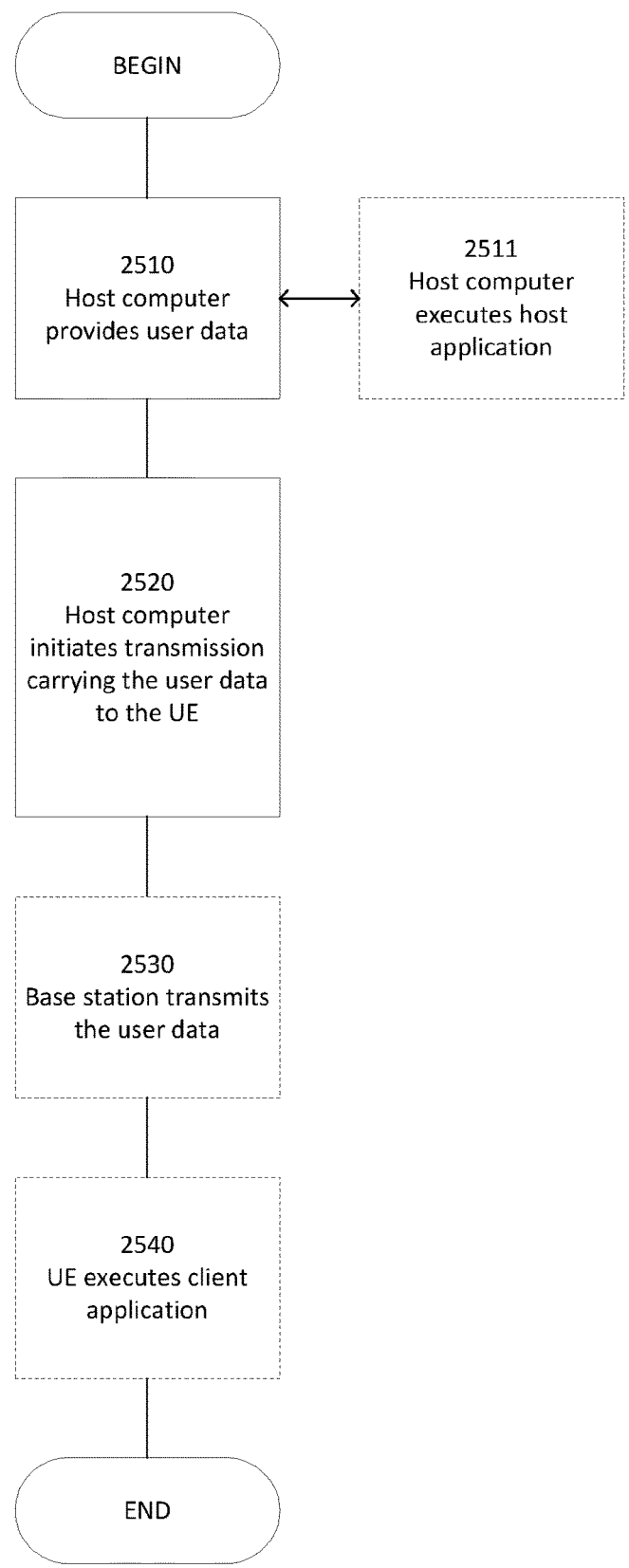
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
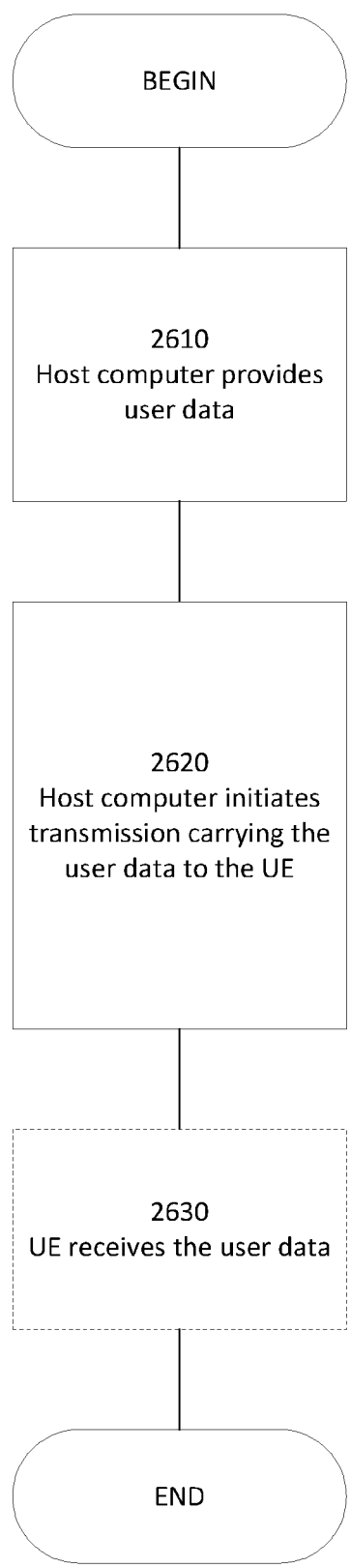
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
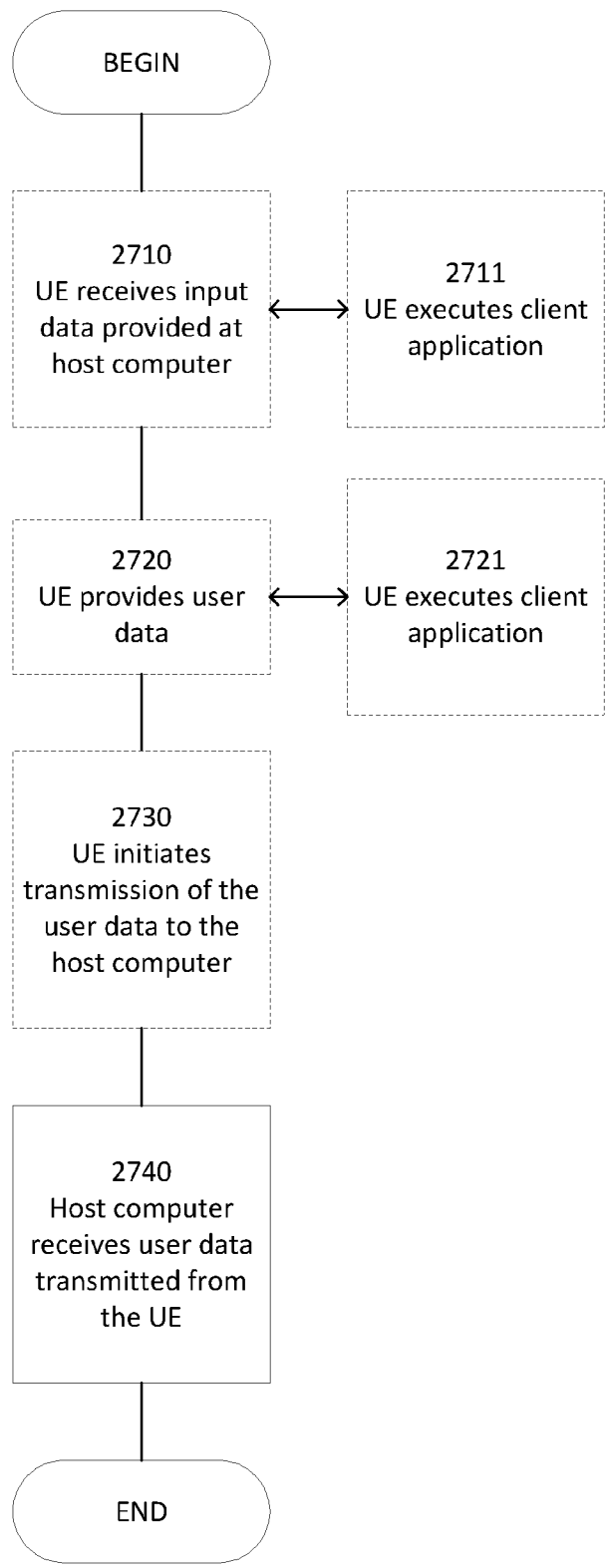
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally, or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
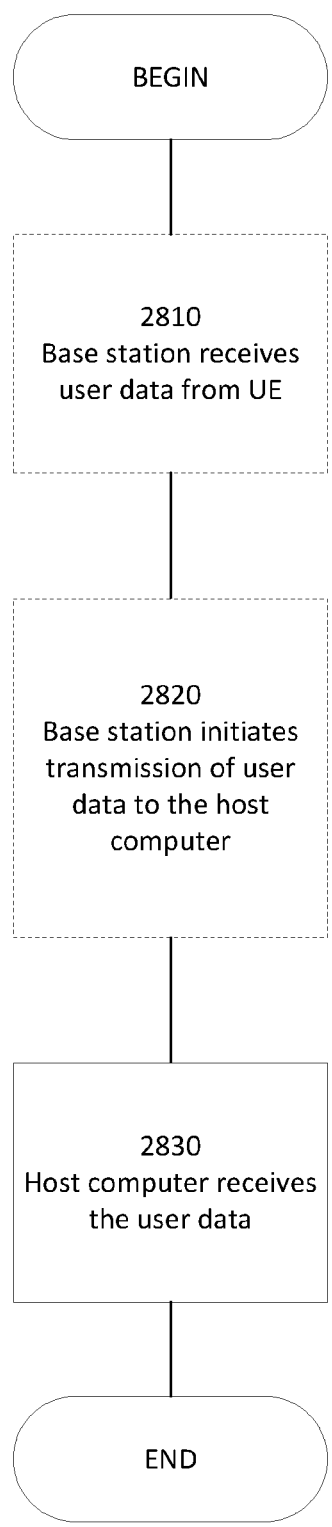
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. Radio network equipment configured to implement a radio access network, RAN, central unit, the radio network equipment comprising:
  communication circuit; and
  processing circuitry configured to:
    decide, by the RAN central unit, which of multiple RAN distributed units is to be responsible for activating duplication of traffic of a radio bearer over multiple paths, wherein different ones of the RAN distributed units serve different respective ones of the multiple paths; and
    transmit, from the RAN central unit, via the communication circuitry, control signalling to each of one or more of the RAN distributed units indicating whether or not the RAN distributed unit is responsible for activating duplication of the traffic of the radio bearer over the multiple paths.

2. The radio network equipment of claim 1, wherein the processing circuitry is configured to decide which of the RAN distributed units is to be responsible for activating duplication of the traffic of the radio bearer over the multiple paths by deciding which of the multiple paths is the primary path over which the traffic is to be transmitted irrespective of whether the traffic is also transmitted in duplicate over one or more others of the multiple paths, wherein the RAN distributed unit that serves the primary path is responsible for said activating.

3. The radio network equipment of claim 1, the processing circuitry is further configured to receive at the RAN central unit channel state information indicating channel conditions for the wireless device, and wherein the processing circuitry is configured to decide which of the RAN distributed units is to be responsible for activating duplication of the traffic of the radio bearer over the multiple paths, based on the received channel state information.

4. The radio network equipment of claim 1, the processing circuitry is further configured to transmit, to a RAN distributed unit responsible for activating duplication of the traffic of the radio bearer over the multiple paths, control signalling indicating whether or not duplication of traffic of a different radio bearer is activated.

5. The radio network equipment of claim 1, wherein the traffic is uplink traffic.

6. The radio network equipment of claim 1, wherein the RAN central unit terminates an interface to a core network of a wireless communication system and each RAN distributed unit terminates a radio interface to the wireless device.

7. The radio network equipment of claim 1, wherein the RAN central unit hosts a packet data convergence protocol, PDCP, and wherein duplication of the traffic comprises duplication at a PDCP layer such that PDCP protocol data units, PDUs, are transmitted in duplicate over the multiple paths.

8. The radio network equipment of claim 1, wherein each RAN distributed unit hosts a radio link control, RLC, protocol, and wherein the multiple paths are associated with different respective radio link control, RLC, bearers.

9. The radio network equipment of claim 1, wherein the radio bearer is a data radio bearer, DRB.

10. Radio network equipment configured to implement a radio access network, RAN, distributed unit, the radio network equipment comprising:
communication circuitry; and
processing circuitry configured to:
configure the RAN distributed unit to serve one of multiple paths over which traffic of a radio bearer is configurable to be transmitted in duplicate between a RAN central unit and a wireless device, wherein different RAN distributed units serve different respective ones of the multiple paths;
receive, by the RAN distributed unit, via the communication circuitry, control signaling from the RAN central unit indicating whether or not the RAN distributed unit is responsible for activating duplication of the traffic of the radio bearer over the multiple paths; and
configure the RAN distributed unit to take on responsibility for activating said duplication or to be relieved from that responsibility according to the control signalling.

11. The radio network equipment of claim 10, wherein the control signalling is included in a context setup request message.

12. The radio network equipment of claim 10, the processing circuitry is further configured to receive, from the RAN central unit, control signalling indicating whether duplication of traffic of a different radio bearer is to be activated or de-activated.

13. The radio network equipment of claim 10, the processing circuitry is further configured to:

decide whether to activate or de-activate duplication of the traffic of the radio bearer over the multiple paths; and
transmit to the wireless device control signaling indicating:
whether duplication of the traffic of the radio bearer is to be activated or de-activated in accordance with said decision; and
whether duplication of the traffic of the different radio bearer is to be activated or de-activated in accordance with the received control signaling indicating whether duplication of traffic of the different radio bearer is to be activated or de-activated.

14. The radio network equipment of claim 10, wherein the traffic is uplink traffic.

15. The radio network equipment of claim 10, wherein the RAN central unit terminates an interface to a core network of a wireless communication system and each RAN distributed unit terminates a radio interface to the wireless device.

16. The radio network equipment of claim 10, wherein the RAN central unit hosts a packet data convergence protocol, PDCP, and wherein duplication of the traffic comprises duplication at a PDCP layer such that PDCP protocol data units, PDUs, are transmitted in duplicate over the multiple paths.

17. The radio network equipment of claim 10, wherein each RAN distributed unit hosts a radio link control, RLC, protocol, and wherein the multiple paths are associated with different respective radio link control, RLC, bearers.

18. The radio network equipment of claim 10, wherein the radio bearer is a data radio bearer, DRB.

19. A method performed by radio network equipment configured to implement a radio access network (RAN) central unit, the method comprising:
deciding, by the RAN central unit, which of multiple RAN distributed units is to be responsible for activating duplication of traffic of a radio bearer over multiple paths, wherein different ones of the RAN distributed units serve different respective ones of the multiple paths; and
transmitting, by the RAN central unit, control signalling to each of one or more of the RAN distributed units indicating whether or not the RAN distributed unit is responsible for activating duplication of the traffic of the radio bearer over the multiple paths.

20. The method of claim 19, wherein the control signalling is included in a context setup request message.

21. The method of claim 19, wherein deciding which of the RAN distributed units is to be responsible for activating duplication of the traffic of the radio bearer over the multiple paths comprises deciding which of the multiple paths is the primary path over which the traffic is to be transmitted irrespective of whether the traffic is also transmitted in duplicate over one or more others of the multiple paths, wherein the RAN distributed unit that serves the primary path is responsible for said activating.

22. The method of claim 19, further comprising receiving at the RAN central unit channel state information indicating channel conditions for the wireless device, and wherein deciding which of the RAN distributed units is to be responsible for activating duplication of the traffic of the radio bearer over the multiple paths is performed based on the received channel state information.

23. A method performed by radio network equipment configured to implement a radio access network (RAN) distributed unit, the method comprising:

configuring the RAN distributed unit to serve one of multiple paths over which traffic of a radio bearer is configurable to be transmitted in duplicate between a RAN central unit and a wireless device, wherein different RAN distributed units serve different respective ones of the multiple paths;

receiving by the RAN distributed unit control signaling from the RAN central unit indicating whether or not the RAN distributed unit is responsible for activating duplication of the traffic of the radio bearer over the multiple paths; and configuring the RAN distributed unit to take on responsibility for activating said duplication or to be relieved from that responsibility according to the control signalling.

24. The method of claim 23, wherein the control signalling is included in a context setup request message.

25. The method of claim 23, further comprising receiving, from the RAN central unit, control signalling indicating whether duplication of traffic of a different radio bearer is to be activated or de-activated.

26. The method of claim 25, further comprising:

deciding whether to activate or de-activate duplication of the traffic of the radio bearer over the multiple paths; and transmitting to the wireless device control signaling indicating:

whether duplication of the traffic of the radio bearer is to be activated or de-activated in accordance with said deciding; and whether duplication of the traffic of the different radio bearer is to be activated or de-activated in accordance with the received control signaling indicating whether duplication of traffic of the different radio bearer is to be activated or de-activated.

* * * * *